United States Patent [19]
Shimazu et al.

[11] Patent Number: 5,999,658
[45] Date of Patent: *Dec. 7, 1999

[54] IMAGE TONE INTERPOLATION METHOD AND APPARATUS THEREFOR

[75] Inventors: Shigeaki Shimazu; Hiroki Fujimoto, both of Kyoto; Tetsuo Asano, Toyonaka, all of Japan

[73] Assignee: Dainippon Screen Mfg. Co., Ltd., Kyoto, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/882,790

[22] Filed: Jun. 26, 1997

[30] Foreign Application Priority Data

Jun. 28, 1996 [JP] Japan .................................... 8-188375
Jun. 28, 1996 [JP] Japan .................................... 8-188376

[51] Int. Cl.$^6$ ........................................................ G06K 9/00
[52] U.S. Cl. ........................................... 382/266; 382/269
[58] Field of Search .................................... 382/266, 269, 382/274, 268

[56] References Cited

U.S. PATENT DOCUMENTS 5,020,119 5/1991 Tai et al. .................................... 382/50
5,379,350 1/1995 Shimazu .................................... 382/22
5,454,052 9/1995 Kojima .................................... 382/233
5,625,717 4/1997 Hashimoto et al. .................... 382/260

OTHER PUBLICATIONS

"Contour Representation of an Image with Applications" Tetsuo Asano, pp. 14–22.
"A Method of Dominant Point Detection" Ryuzo Takiyama et al., 1993, pp. 15–21.

*Primary Examiner*—Thomas D. Lee
*Assistant Examiner*—Stephen Brinich
*Attorney, Agent, or Firm*—McDermott, Will & Emery

[57] ABSTRACT

All possible image levels of image data are input to tone conversion characteristics, and a tone jump included in the image after tone conversion is detected from the resultant output data. An A-type contour line and a B-type contour line constituting the contours of a target area for tone interpolation are obtained from the multi-tone image. The target area is then detected by checking the inclusive relationship between the A-type and B-type contour lines to extract at least one set of contour lines indicating the contour of the target area. In the target area, an area defined by the A-type contour line and the B-type contour line is divided into (N+1) divided areas, and N intermediate image levels are sequentially allocated to the N divided areas of the (N+1) divided areas.

21 Claims, 36 Drawing Sheets

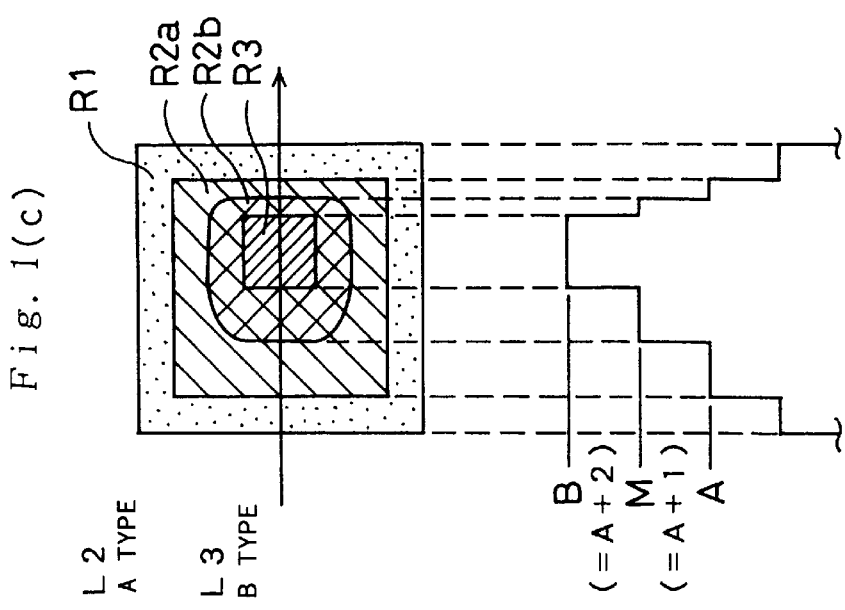
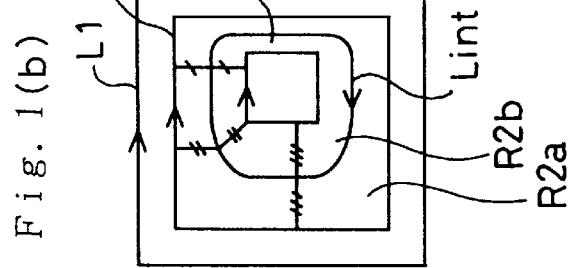
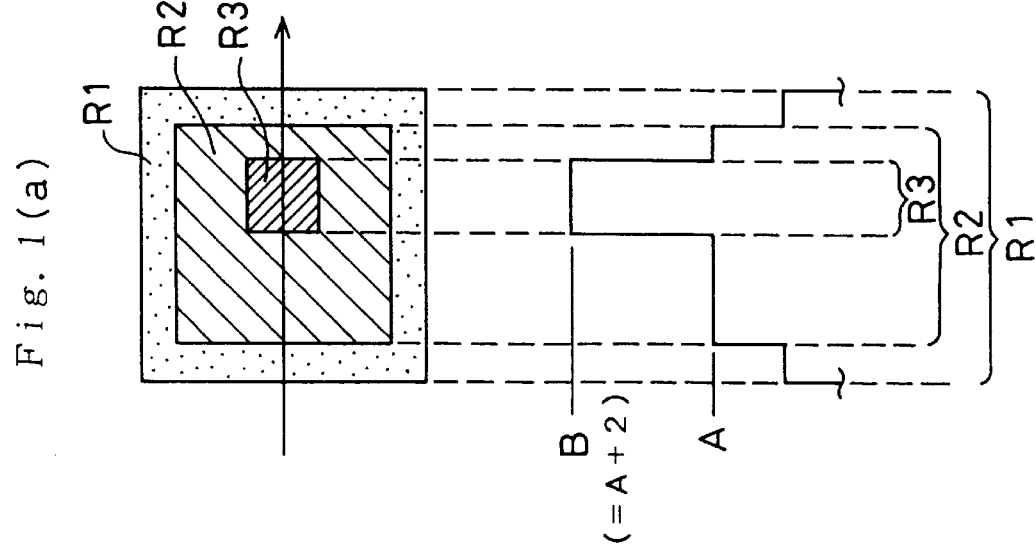

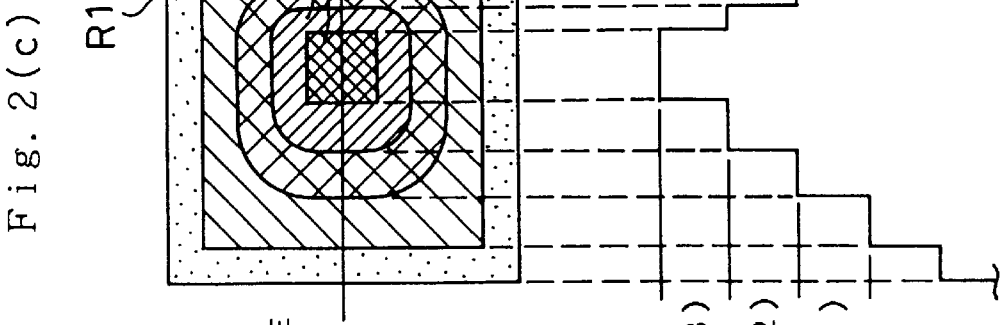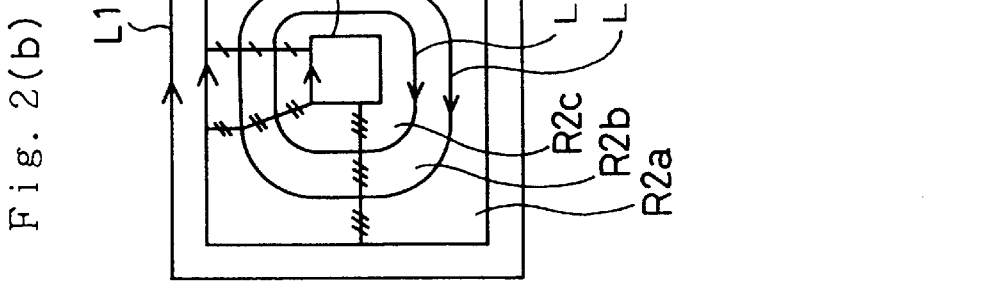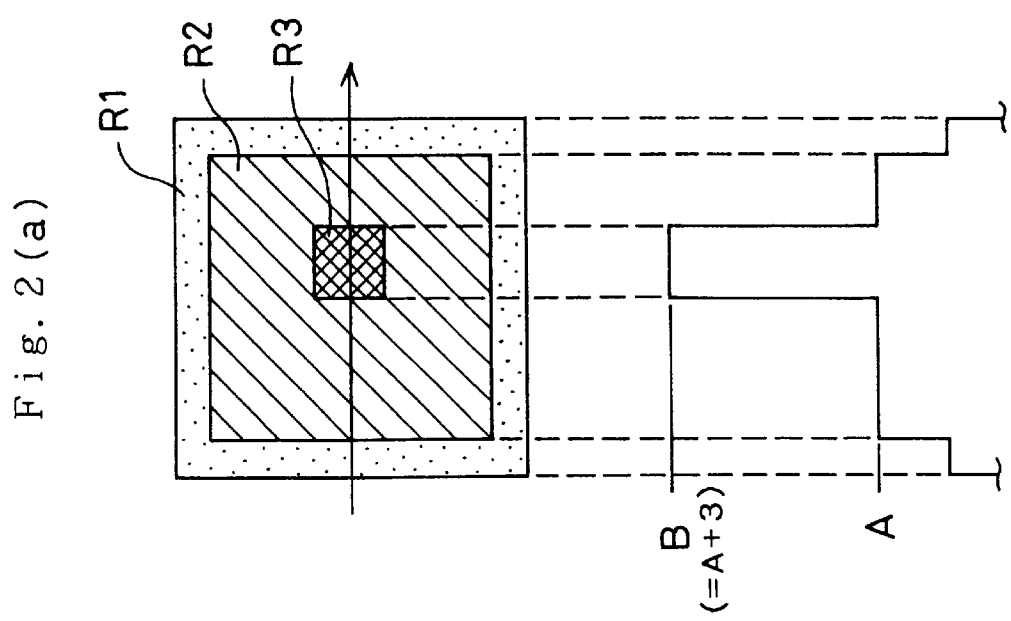

Fig. 6(a) ORIGINAL MULTI-TONE IMAGE DATA
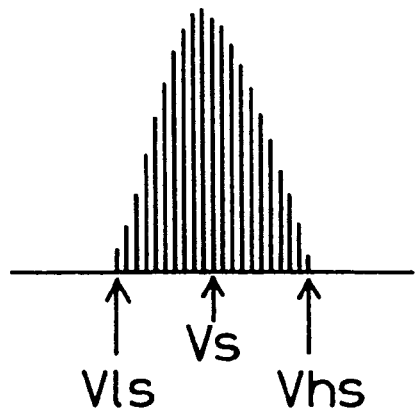
Fig. 6(b) AFTER CONTRACT CORRECTION
(TONE-CONVERTED IMAGE DATA)
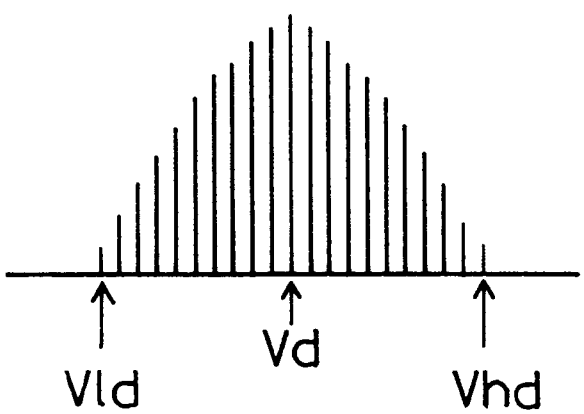
Fig. 6(c) AFTER TONE INTERPOLATION
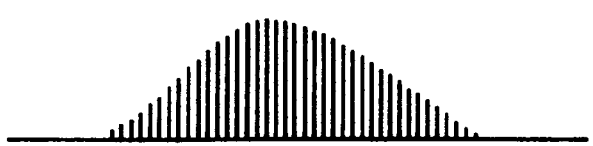

Fig. 7(a) ORIGINAL MULTI-TONE IMAGE DATA
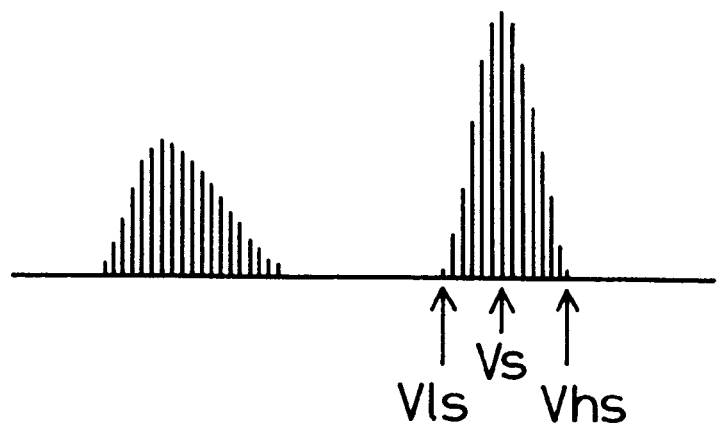
Fig. 7(b) AFTER CONTRACT CORRECTION
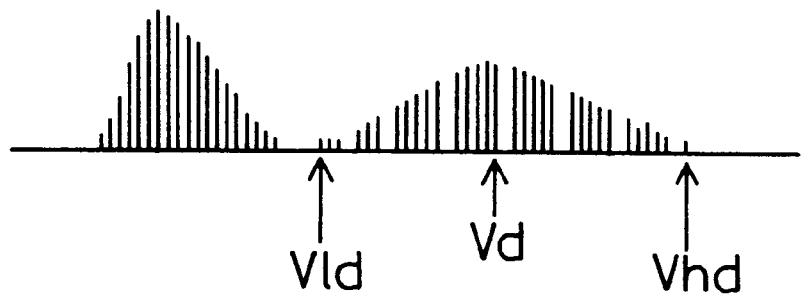
Fig. 7(c) AFTER TONE INTERPOLATION
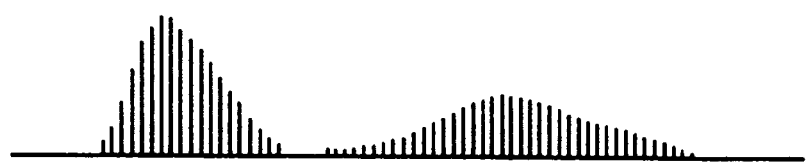

Fig. 8(a) ORIGINAL MULTI-TONE IMAGE DATA
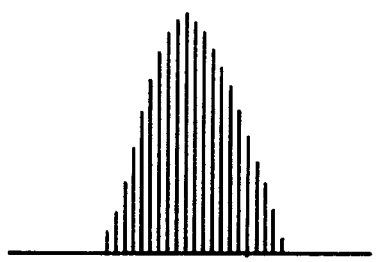
Fig. 8(b) AFTER HISTOGRAM SMOOTHING PROCESS
(TONE-CONVERTED IMAGE DATA)
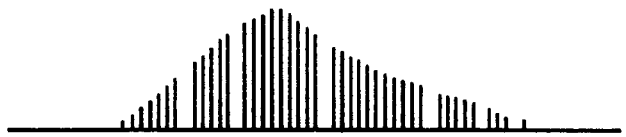
Fig. 8(c) AFTER TONE INTERPOLATION
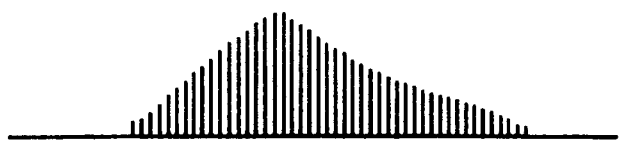

Fig. 11(a) TONE CONTOUR LINE
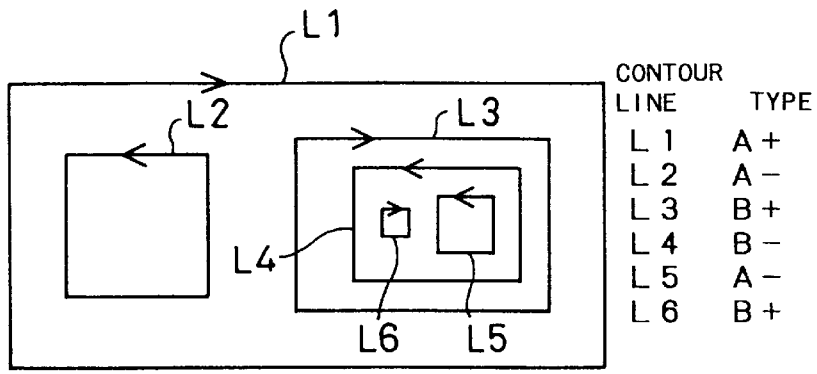
Fig. 11(b) MULTI-TONE IMAGE
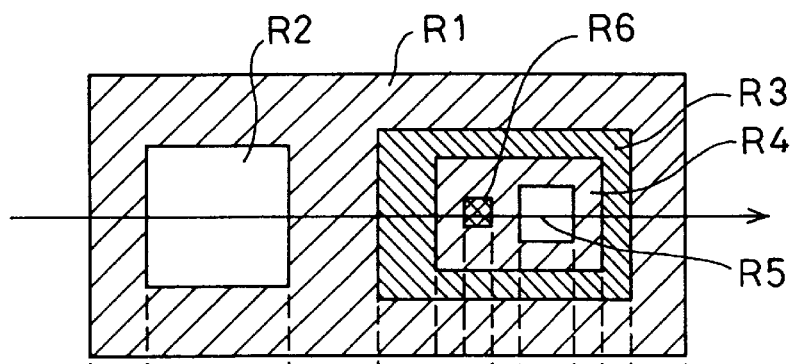
Fig. 11(c)
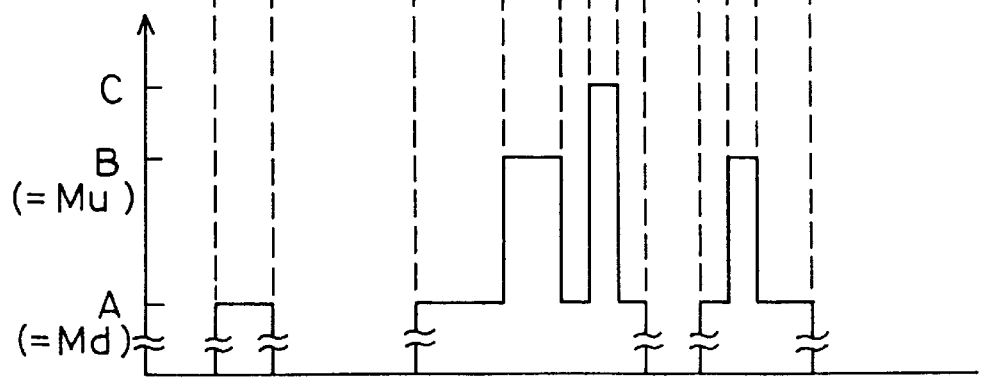

Fig. 12(a) MULTI-TONE IMAGE
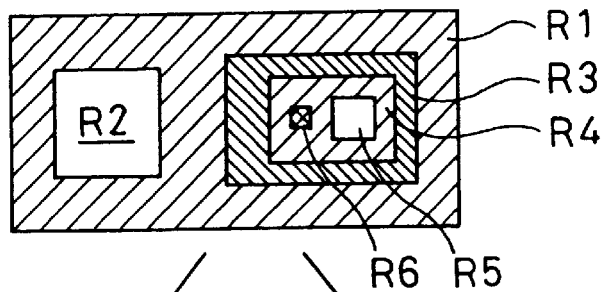
Fig. 12(b-1)
BINARIZATION AT A LEVEL
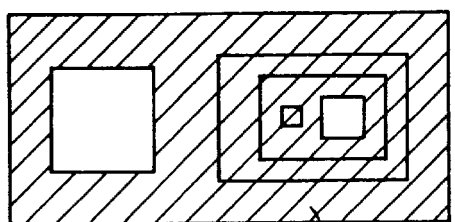
R1+R3
+R4+R6
Fig. 12(c-1)
BINARIZATION AT B LEVEL
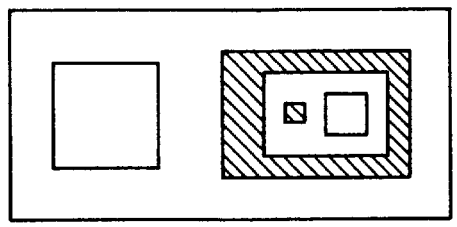
Fig. 12(b-2)
DETECTED CONTOUR LINE
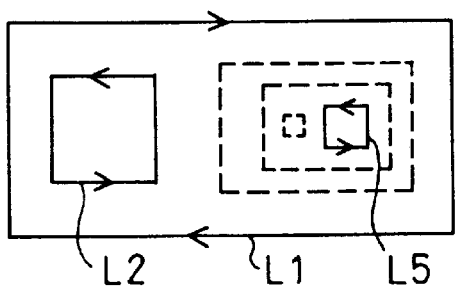
| CONTOUR LINE | TYPE |
|---|---|
| L1 | A+ |
| L2 | A- |
| L5 | A- |
Fig. 12(c-2)
DETECTED CONTOUR LINE
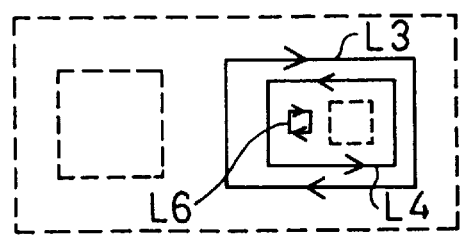
| CONTOUR LINE | TYPE |
|---|---|
| L3 | B+ |
| L4 | B- |
| L6 | B+ |

BOUNDARY CONTOUR LINE

Fig. 14(a-1) ONLY A+
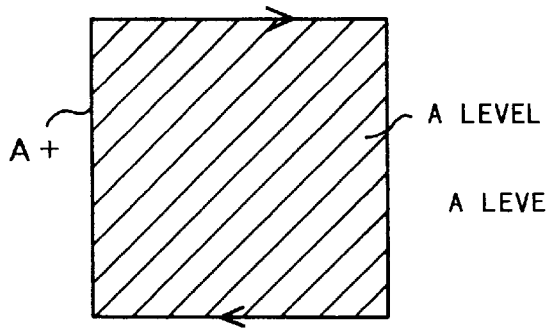
Fig. 14(b-1) ONLY B-
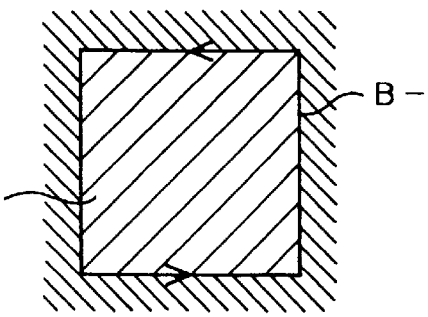
Fig. 14(a-2) A+⊕A-
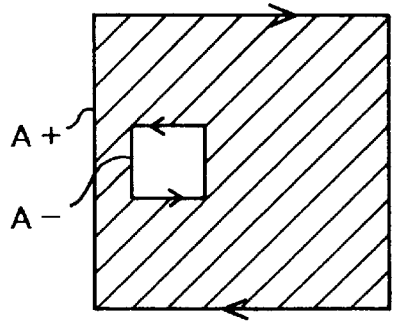
Fig. 14(b-2) B-⊕B+
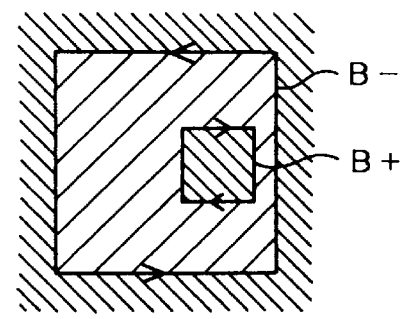
Fig. 14(a-3) A+⊕B+
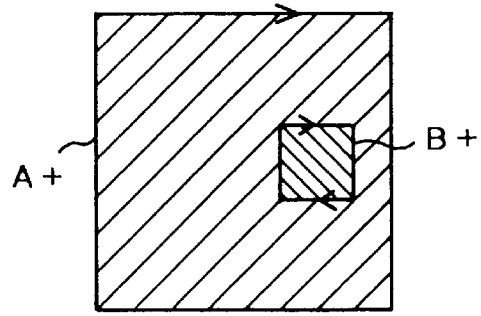
Fig. 14(b-3) B-⊕A-
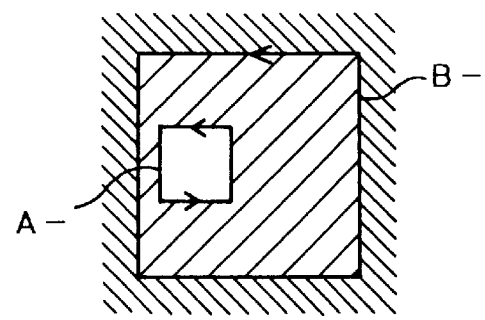
Fig. 14(a-4)
A+⊕A-⊕B+
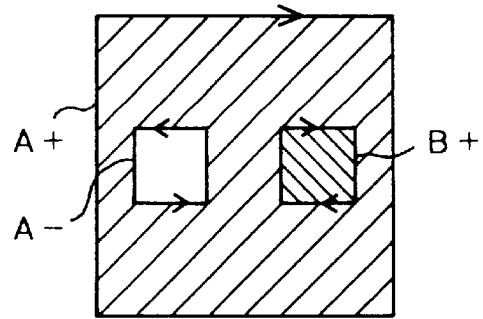
Fig. 14(b-4)
B-⊕B+⊕A-
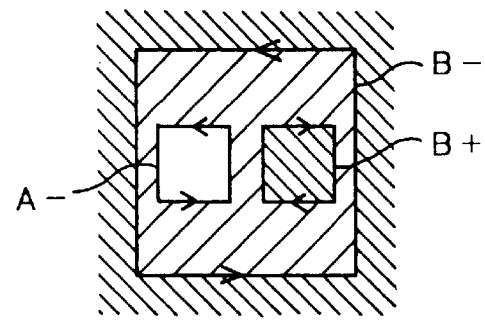

Fig. 17 (a)
DETERMINATION BY CIRCUMSCRIBED RECTANGLE
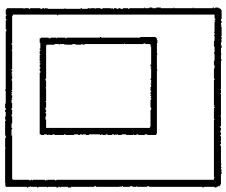
INCLUSION PROBABLE
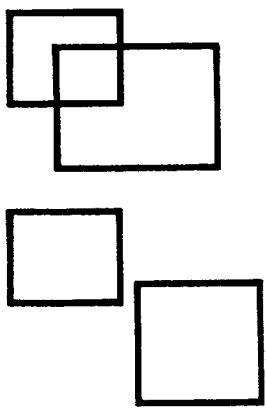
NO INCLUSIVE RELATIONSHIP
Fig. 17 (b)
DETERMINATION BY HALF-LINE METHOD
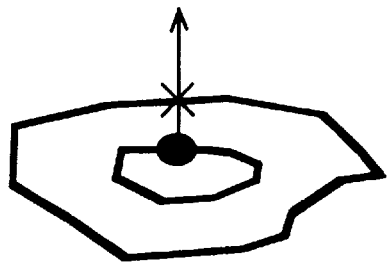
○ INCLUSIVE RELATIONSHIP
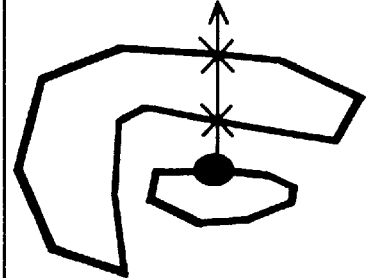
× NO INCLUSIVE RELATIONSHIP Fig. 18(a) MULTI-TONE IMAGE

FIRST SET OF CONTOUR L1 (A+) L3 (B+)
LINES

L2 (A-)

TARGET AREA

A-LOOP BUFFER 66a
| DL1 ; DL2 |

B-LOOP BUFFER 66b
| DL3 |

SECOND SET OF PROFILE LINES
L4 (B-)

L6  L5 (A-)
(B+)

A-LOOP BUFFER 66a
| DL5 |

B-LOOP BUFFER 66b
| DL4 : DL6 |

Fig. 19(a) ONE SET OF CONTOUR LINES
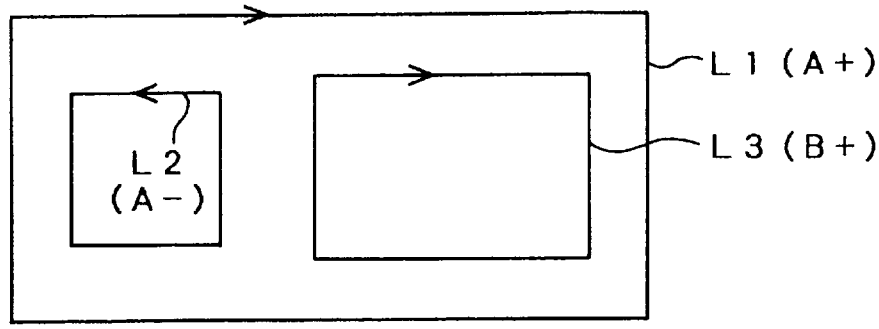
Fig. 19(b) AREA WHICH IS IN NEW LOOP AND OUTSIDE A- TYPE CHILD LOOP IS FILLED WITH A LEVEL
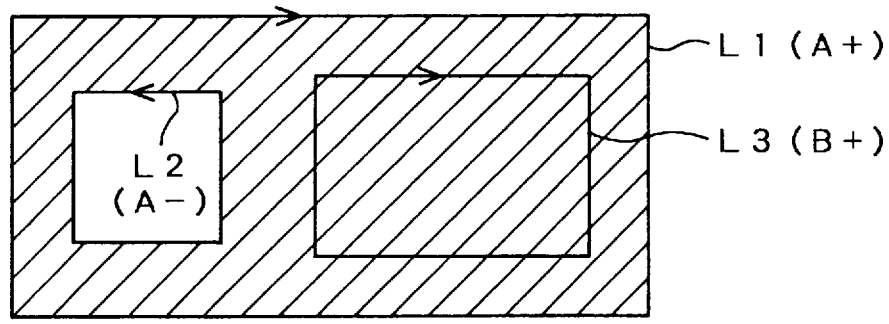
Fig. 19(c) REMOVE AREA INSIDE B+ TYPE CHILD LOOP
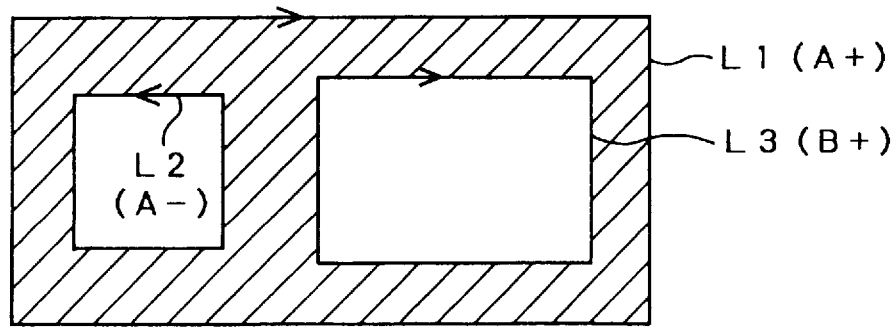

TONE CONTOUR LINE PORTION USED IN DISTANCE CALCULATION

Fig. 22(a) FIRST SET OF CONTOUR LINES
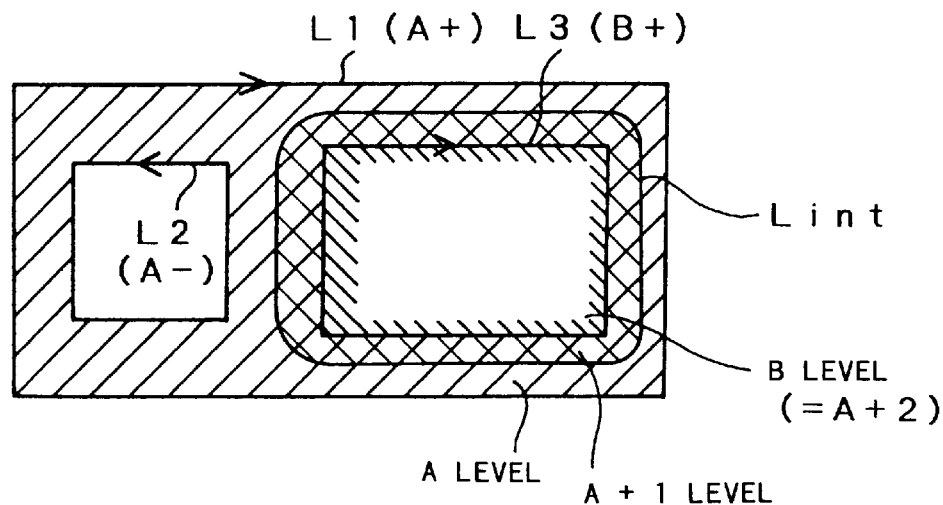
Fig. 22(b) SECOND SET OF CONTOUR LINES
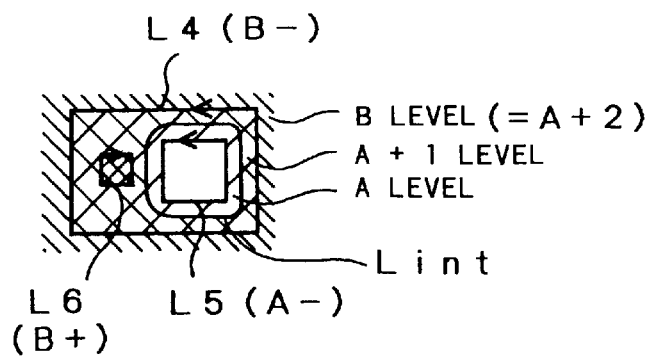

Fig. 23(a) BEFORE TONE INTERPOLATION
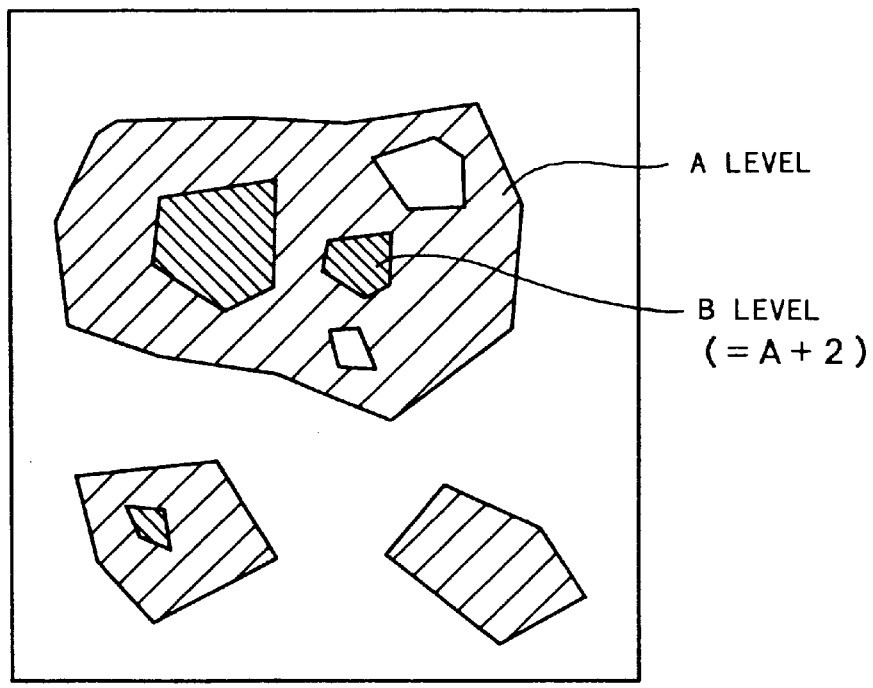
Fig. 23(b) AFTER TONE INTERPOLATION
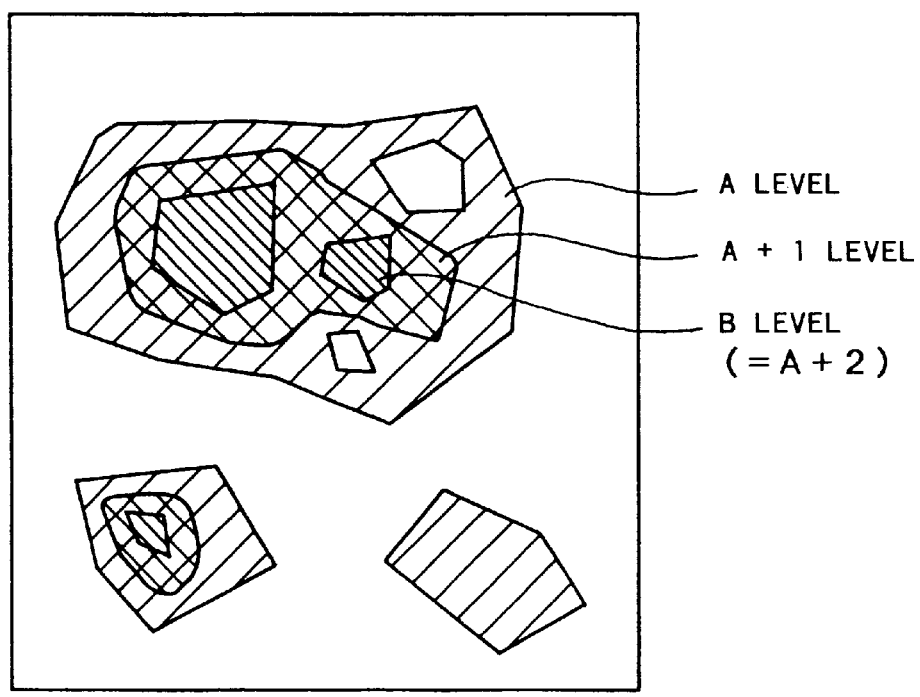

Fig. 26(A)  FIRST CONVERSION
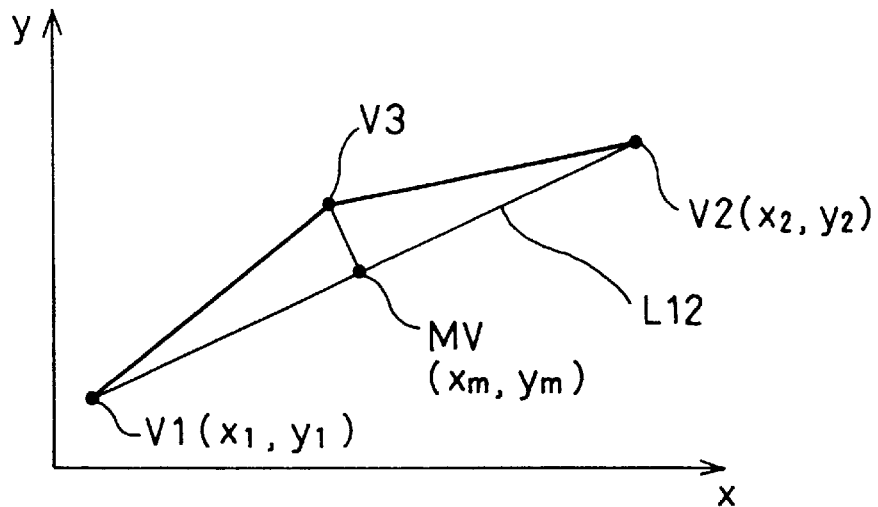
Fig. 26(B)  SECOND CONVERSION
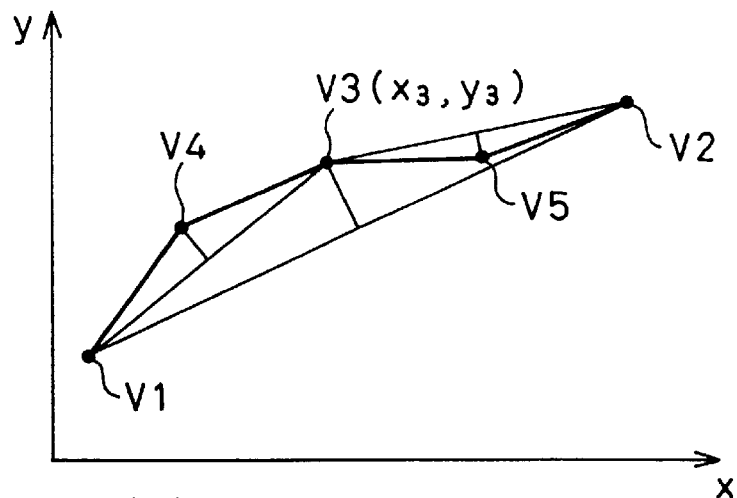
Fig. 26(C)  THIRD CONVERSION
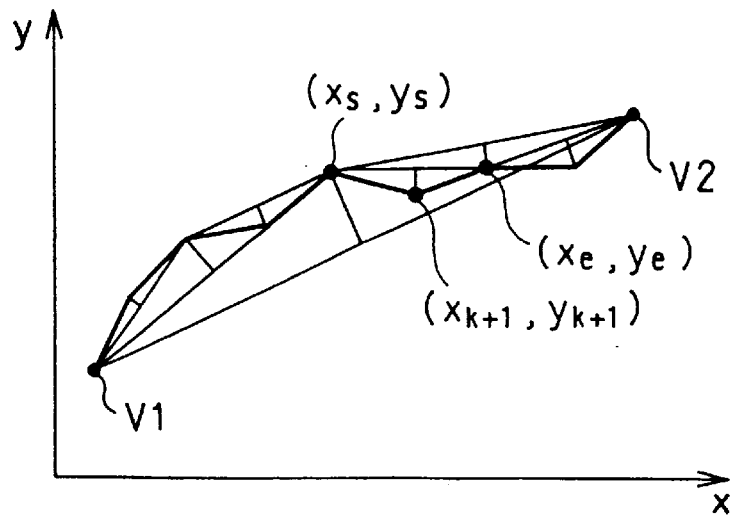

INTERMEDIATE CONTOUR LINE $(x_{i-1}, y_{i-1})$
$(x_i, y_i)$
$(x_{i+1}, y_{i+1})$ $$(x'_i, y'_i) = a(x_i, y_i) + \frac{1-a}{2}\{(x_{i-1}, y_{i-1}) + (x_{i+1}, y_{i+1})\}$$

TONE CORRECTION USING LUT

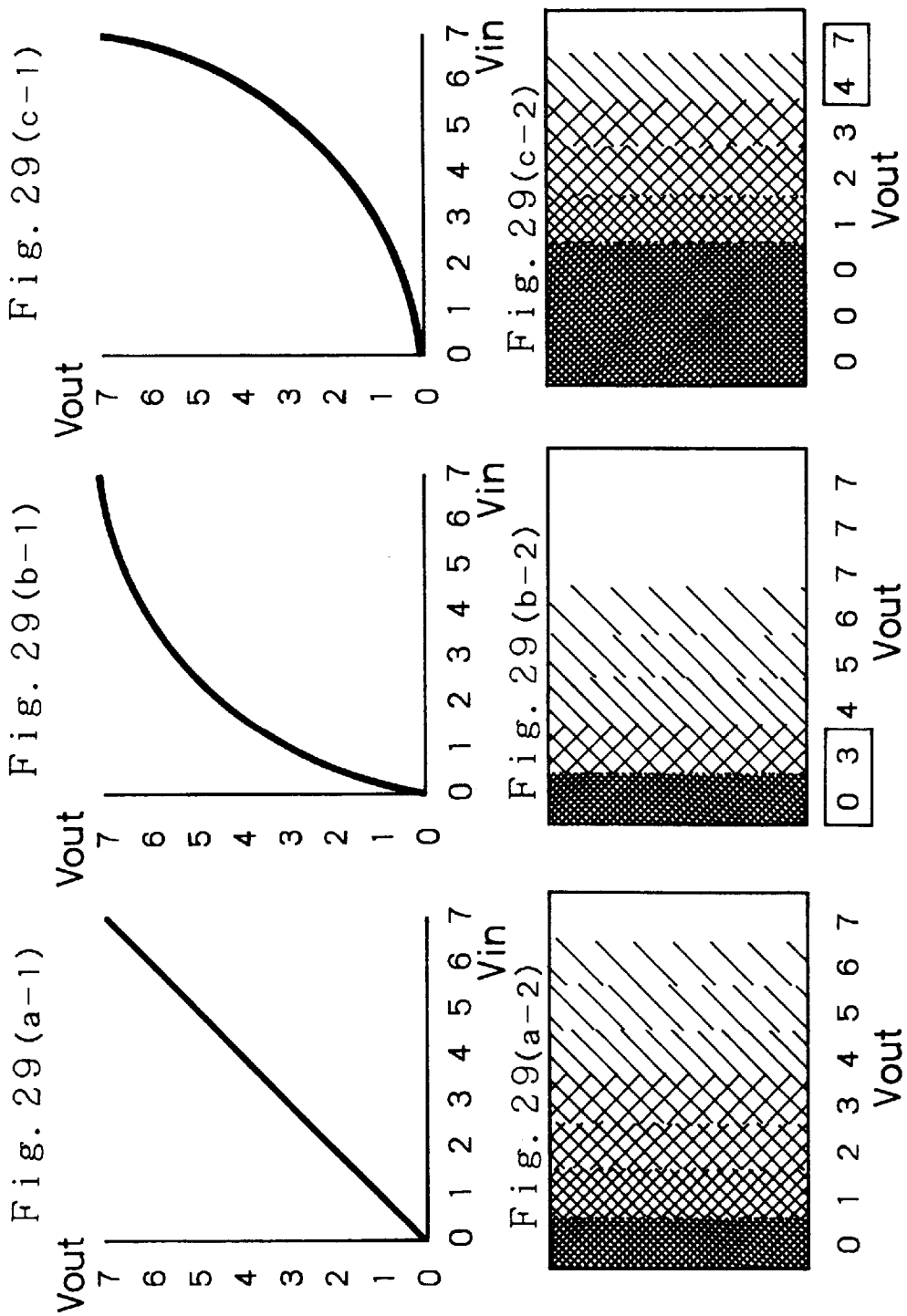

TONE CHANGE BY ADDING LOWER BITS

Fig. 33(a) ORIGINAL MULTI-TONE IMAGE DATA
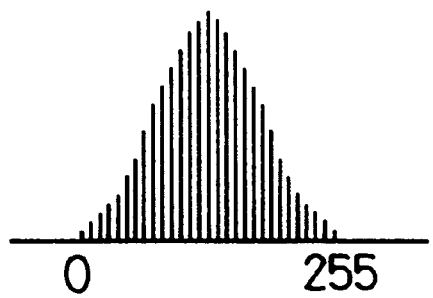
Fig. 33(b) AFTER ADDITION OF LOWER BITS
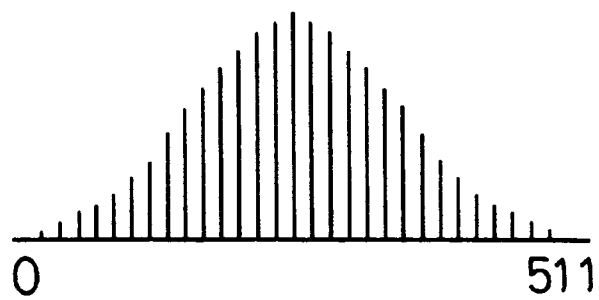
Fig. 33(c) AFTER TONE INTERPOLATION
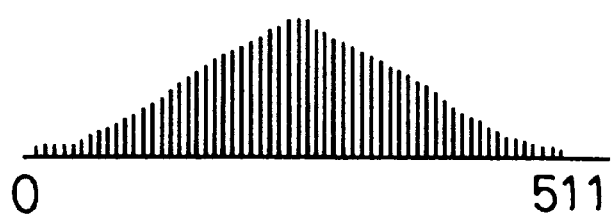

$A = 6$
$B = 10$

TONE INTERPOLATION AFTER EXPANSION

IMAGE TONE INTERPOLATION METHOD AND APPARATUS THEREFOR

BACKGROUND OF THE INVENTION

1. Field of the Invention

The present invention relates to a technique for interpolating tones of a multi-tone image.

2. Description of the Related Art

As a kind of image processing using a computer, various tone conversion for a multi-tone image are performed. A tone jump is disadvantageously generated due to the tone conversion for a multi-tone image. The "tone jump" means a phenomenon that image levels of adjacent areas change stepwise to omit at least one image level between them. Such a tone jump will cause a pseudo line, which is observed with naked eyes. In other words, the image having a tone jump disadvantageously shows a undesirable line although its original image has no such lines.

Conventionally, when such a tone jump is present, it is alleviated by averaging pixel data around the tone jump area. However, the averaging process disadvantageously blurs the image.

SUMMARY OF THE INVENTION

An object of the present invention is to provide a technique for eliminating a tone jump of a multi-tone image without an averaging process.

The above and other objects of the present invention are attained at least partly by a method of interpolating a tone jump in a multi-tone image. The method comprises the steps of: (a) providing target multi-tone image data having a tone jump, the tone jump including a plurality of missing image levels between a first image level and a second image level, the first image level being greater than the second level; (b) processing the target multi-tone image data to obtain first contour data representing an A-type contour line indicating a boundary between an area having the first image level and another area having an image level lower than the first image level; (c) processing the target multi-tone image data to obtain second contour data representing a B-type contour line indicating a boundary between the area having the first image level and other area having an image level no lower than the second image level; (d) examining an inclusive relationship between the A-type and B-type contour lines on the basis of the first and second contour data to detect a target area for tone interpolation and to extract a set of contour lines indicating a boundary of the target area among the A-type and B-type contour lines, the target area being included in the area having the first image level and being adjacent to an area having the second image level; and (e) dividing an area, within the target area, located between the A-type contour line and the B-type contour line of the set of contour lines into (N+1) divided areas, where N is an integer of at least 1, and sequentially allocating N intermediate image levels to N divided areas which are closer to the image area having the second image level among the (N+1) divided areas.

In the above method, the tone jump in the target area is interpolated by allocating N intermediate image levels, but not by performing the image data averaging process.

In a preferred embodiment, the step (a) comprises the steps of: (i) executing tone conversion on original multi-tone image data to produce the target multi-tone image data; (ii) identifying the first and second image levels to be included in the target multi-tone image data.

The step (ii) may comprise the steps of: converting all possible image levels of the target multi-tone image data by tone conversion characteristics of the tone conversion in the step (i), to thereby generate all-levels conversion data; and detecting the tone jump present in the all-levels conversion data and determining a lower-next image level of the detected tone jump as the first and determining an upper-next image level of the detected tone jump as the second image level.

The target multi-tone image data may include a plurality of tone jumps. In this case, the step (ii) may comprise the step of obtaining plural sets of the first and second image levels with respect to the plurality of tone jumps. The method further comprises the step of: (f) executing the steps (b) through (e) with respect to each of the plural sets of the first and second image levels.

In another embodiment, the step (e) comprises the step of determining an image level of each pixel in the target area according the following Equation to produce the (N+1) divided areas:

$$val(p) = val(md) + \frac{\{val(Mu) - val(Md)\} \times D(Md)}{D(Md) + D(Mu)}$$

where val(p) is the image level of each pixel in the target area, val(Md) is the first image level, val(Mu) is the second image level, D(Md) is a minimum distance from a pixel-to-processed to the A-type contour line, and D(Mu) is a minimum distance from the pixel-to-processed to the B-type contour line.

Preferably, the step (e) comprises the step of producing the (N+1) divided areas in the target area such that N intermediate contour lines dividing the (N+1) divided areas are formed at positions where a minimum distance from each intermediate contour line to the A-type contour line and a minimum distance to the B-type contour line among the set of contour lines have a predetermined relationship.

The predetermined relationship is that the minimum distance to the A-type contour line and the minimum distance to the B-type contour line have a ratio of m:n, where m and n are integers satisfying $1 \leq m \leq N$ and $1 \leq n \leq N$, and where N combinations of m and n satisfy m+n =N+1.

The step (d) may comprise the steps of: (d1) classifying the A-type contour lines included in the set of contour lines into an $A^+$-type contour line and an $A^-$-type contour line, the $A^+$-type contour line defining an inner area whose image level is no lower than the first image level, the $A^-$-type contour line defining an inner area whose image level is lower than the first image level; (d2) classifying the B-type contour lines included in the set of contour lines into an $B^+$-type contour line and an $B^-$-type contour line, the $B^+$-type contour line defining an inner area whose image level is no lower than the second image level, the $B^-$-type contour line defining an inner area whose image level is lower than the second image level; and (d3) detecting at least one of a first area and a second area as the target area, the first area being located between the $A^+$-type contour line and the $B^+$-type contour line, the second area being located between the $B^-$-type contour line and the $A^-$-type contour line.

In still another embodiment, the method further comprises the steps of: (g) extracting N intermediate contour lines which are present at boundaries of the (N+1) divided areas; and (h) adding fluctuation to the N intermediate contour lines.

The step (a) may further comprise the step of enlarging the target multi-tone image.

According to an aspect of the present invention, there is provided an apparatus for interpolating a tone jump in a multi-tone image. The apparatus comprises: means for providing target multi-tone image data having a tone jump, the tone jump including a plurality of missing image levels between a first image level and a second image level, the first image level being greater than the second level; first contour detection means for processing the target multi-tone image data to obtain first contour data representing an A-type contour line indicating a boundary between an area having the first image level and another area having an image level lower than the first image level; second contour detection means for processing the target multi-tone image data to obtain second contour data representing a B-type contour line indicating a boundary between the area having the first image level and other area having an image level no lower than the second image level; target contour extraction means for examining an inclusive relationship between the A-type and B-type contour lines on the basis of the first and second contour data to detect a target area for tone interpolation and to extract a set of contour lines indicating a boundary of the target area among the A-type and B-type contour lines, the target area being included in the area having the first image level and being adjacent to an area having the second image level; and interpolation means for dividing an area, within the target area, located between the A-type contour line and the B-type contour line of the set of contour lines into (N+1) divided areas, where N is an integer of at least 1, and sequentially allocating N intermediate image levels to N divided areas which are closer to the image area having the second image level among the (N+1) divided areas.

According to another aspect of the present invention, there is provided a computer program product for interpolating a tone jump in a multi-tone image. The computer program product comprises: a computer readable medium; and computer program code means stored on the computer readable medium. The computer program code means comprises: program code means for causing a computer to provide target multi-tone image data having a tone jump, the tone jump including a plurality of missing image levels between a first image level and a second image level, the first image level being greater than the second level; program code means for causing the computer to process the target multi-tone image data to obtain first contour data representing an A-type contour line indicating a boundary between an area having the first image level and another area having an image level lower than the first image level; program code means for causing the computer to process the target multi-tone image data to obtain second contour data representing a B-type contour line indicating a boundary between the area having the first image level and other area having an image level no lower than the second image level; program code means for causing the computer to examine an inclusive relationship between the A-type and B-type contour lines on the basis of the first and second contour data to detect a target area for tone interpolation and to extract a set of contour lines indicating a boundary of the target area among the A-type and B-type contour lines, the target area being included in the area having the first image level and being adjacent to an area having the second image level; and program code means for causing the computer to divide an area, within the target area, located between the A-type contour line and the B-type contour line of the set of contour lines into (N+1) divided areas, where N is an integer of at least 1, and to sequentially allocate N intermediate image levels to N divided areas which are closer to the image area having the second image level among the (N+1) divided areas.

These and other objects, features, aspects, and advantages of the present invention will become more apparent from the following detailed description of the preferred embodiments with the accompanying drawings.

BRIEF DESCRIPTION OF THE DRAWINGS

FIGS. 1(a)–1(c) show the outline of a tone interpolation method according to the present invention;

FIGS. 2(a)–2(c) show the outline of a method of interpolating a plurality of tones;

FIGS. 6(a)–6(c) schematically illustrate contrast correction using a histogram serving as a kind of a tone conversion process, and the contents of tone interpolation to be performed later;

FIGS. 7(a)–7(c) schematically illustrate another example of contrast correction using a histogram, and the contents of tone interpolation to be performed later;

FIGS. 8(a)–8(c) schematically illustrate results obtained by the smoothing process for a histogram, and the contents of tone interpolation to be performed later;

FIGS. 11(a)–11(c) illustrate an entire multi-tone image subjected to the process in the embodiment, and the tone contour lines detected in step S1;

FIGS. 12(a), 12(b-1), 12(b-2), 12(c-1) and 12(c-2) illustrate the procedure for detecting the tone contour lines L1 to L6 from the multi-tone image;

FIGS. 14(a-1)–14(a-4) and 14(b-1)–14(b-4) illustrate examples of areas constituted by various sets of contour lines;

FIGS. 17(a) and 17(b) show a determination procedure for an inclusive relationship between contour lines;

FIGS. 18(a)–18(c) illustrate two sets of contour lines which are extracted;

FIGS. 19(a)–19(c) illustrate the process contents in steps S16 and S17;

FIGS. 22(a) and 22(b) illustrate the distributions of pixel values val(p) obtained with respect to the first and second sets of contour lines;

FIGS. 23(a) and 23(b) illustrate a result obtained by interpolating the tones of another multi-tone image;

FIGS. 26(A)–26(C) show the outline of a fractalizing process (fluctuation adding process) by a middle-point displacement method;

FIGS. 29(a-1), 29(a-2), 29(b-1), 29(b-2), 29(c-1) and 29(c-2) illustrate a example of tone correction depending on various tone correction characteristics;

FIGS. 33(a)–33(c) illustrate tone correction by an apparently increase in number of bits and the contents of tone interpolation to be performed later;

DESCRIPTION OF THE PREFERRED EMBODIMENT

A. Outline of Tone Interpolation Method

Figure 3:
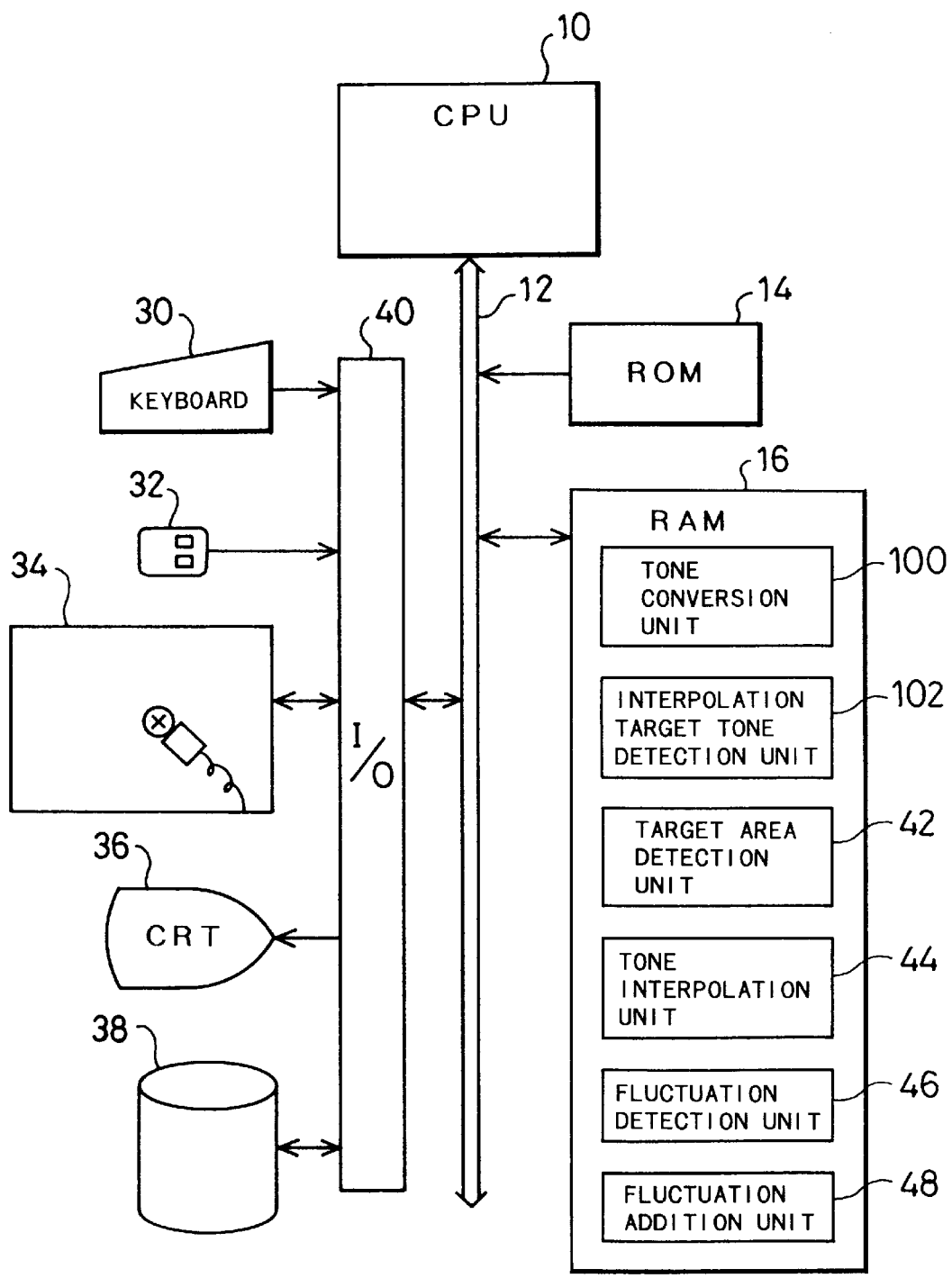
FIG. 3 is a block diagram showing a computer system for applying the embodiment of the present invention to perform tone interpolation to a multi-tone image.

FIGS. 1(a)–1(c) illustrate the outline of a tone interpolation method according to the present invention. FIG. 1(a) shows a multi-tone image to be processed and a change in image level of the multi-tone image. The multi-tone image is divided into three areas R1–R3. In this example, for illustrative convenience, contours of the areas are indicated by rectangles. In a general image, a contour may have an arbitrary shape. Even if the contour has an arbitrary shape other than a rectangle, the following process is performed in the same manner.

As shown in the lower portion of FIG. 1(a), an area R2 is an A-level area whose image data level is 'A', and an area R3 is a B-level area. A tone jump is present between A-level and B-level. In this embodiment, from the multi-tone image as shown in FIG. 1(a), contour lines L1–L3 indicating the contours of the areas R1–R3 as shown in FIG. 1(b) are detected. From the contour lines L1–L3, the area R2 having A-level and adjacent to a B-level area is recognized as a target area for tone interpolation, and a set of contour lines {L2, L3} indicating the boundary between the target area R2 and the other area is extracted. The contour line L2 is "A-type contour line" indicating the boundary between the A-level area R2 and the area R1 having an image level which is lower than the A-level. The contour line L3 is "B-type contour line" indicating the boundary between the A-level area R2 and the area R3 having an image level which is equal to or higher than the B-level. The area R2 surrounded by the above two types of contour lines is used as a target area for tone level interpolation.

The target area R2 is divided into two divided areas R2a and R2b (FIG. 1(b)) with an intermediate contour line Lint, which is formed at a position where a minimum distance from the A-type contour line L2 to the intermediate contour line Lint is equal to that from the B-type contour line L3 to Lint. As will be described later, in this embodiment, the intermediate contour line Lint is not actually formed, and only a virtual intermediate contour line Lint is formed by determining the image levels of pixels in the divided areas R2a and R2b.

As shown in FIG. 1(c), an intermediate image level (M level) between A-level and B-level is allocated to each pixel in the divided area R2b which is closer of the two divided areas R2a and R2b to the B-level area R3. As is understood in comparison with the original multi-tone image in FIG. 1(a), a tone jump is moderated in the multi-tone image in FIG. 1(c). Since the process shown in FIGS. 1(a)–1(c) does not include a process of averaging pixel data, a tone jump of the multi-tone image can be eliminated without blurring the image.

In a general multi-tone image, extraction of a set of contour lines {L2, L3} which surround the target area R2 having A-level is not always easy. In this embodiment, as will be described later, a plurality of contour lines of the multi-tone image are classified into a plurality of types (A+, A−, B+, and B−-types), and an inclusive relationship between contour lines is checked, so that at least one set of contour lines indicating the boundary between the target area and the other image area is extracted. The target area surrounded by the sets of contour lines is subjected to the process shown in FIGS. 1(a)–1(c) to perform tone interpolation.

FIGS. 2(a)–2(c) illustrate the outline of a method of interpolating a plurality of tones. In FIG. 2(a), a tone jump of plural tone steps (two in this embodiment) is present between the image level A of the area R2 and the image level B of the area R3. More specifically, B=A+3. Therefore, in FIG. 2(b), the target area R2 is divided into three divided areas R2a–R2c with two intermediate contour lines Lint1 and Lint2, which are formed at positions where the ratios of the minimum distances from the respective lines Lint1 and Lint2 to the two contour lines L2 and L3 surrounding the A-level area R2 are 1: 2 and 2:1, respectively. As shown in FIG. 2(c), intermediate image levels M1 and M2 are allocated to the divided areas R2b and R2c which are closer to the B-level area R3 than the other divided area R2a is.

In general, when N (N is an integer of at least 1) intermediate image levels $M_1$–$M_N$ are interposed between A-level and B-level, N intermediate contour lines can be set so that their minimum distance to the A-type contour line L2 and those to the B-type contour line L3 have a ratio of m:n, where m and n are integers satisfying $1 \leq m \leq N$ and $1 \leq n \leq N$, and where N sets of combinations of m and n satisfy m+n=N+1. The N intermediate contour lines divides the target area into (N+1) divided areas, and N intermediate image levels are allocated to N divided areas in order which are closer to the B-level area (that is, except the divided area farthest to the B-level area). In this manner, as shown in FIG. 2(c), a smoothed image which is free from a tone jump can be obtained.

The case of FIGS. 1(a)–1(c) wherein a target area is divided into two divided areas will be described below. However, the following description can be readily extended to a general case wherein a target area is divided into (N+1) divided areas.

In the following description, data indicating A-level is referred to as "under marker Md", and another data indicating B-level is referred to as "upper marker Mu." In other words, the under marker Md is a marker indicating the lower level A of two image levels subjected to tone interpolation, and the upper marker Mu is a marker indicating the upper level B.

B. Apparatus Structure

FIG. 3 is a block diagram showing a computer system for embodying the present invention to execute tone interpolation on a multi-tone image. This computer system comprises CPU 10 and a bus line 12. ROM 14 and RAM 16 are connected to the bus line 12. A keyboard 30, a mouse 32, a digitizer 34, a color CRT 36, and a magnetic disk 38 are connected to the bus line 12 through an input/output interface 40.

RAM 16 stores an applications program for implementing a tone conversion unit 100, an interpolation target tone detection unit 102, a target area detection unit 42, a tone interpolation unit 44, a fluctuation detection unit 46, and a fluctuation addition unit 48.

Figure 4:
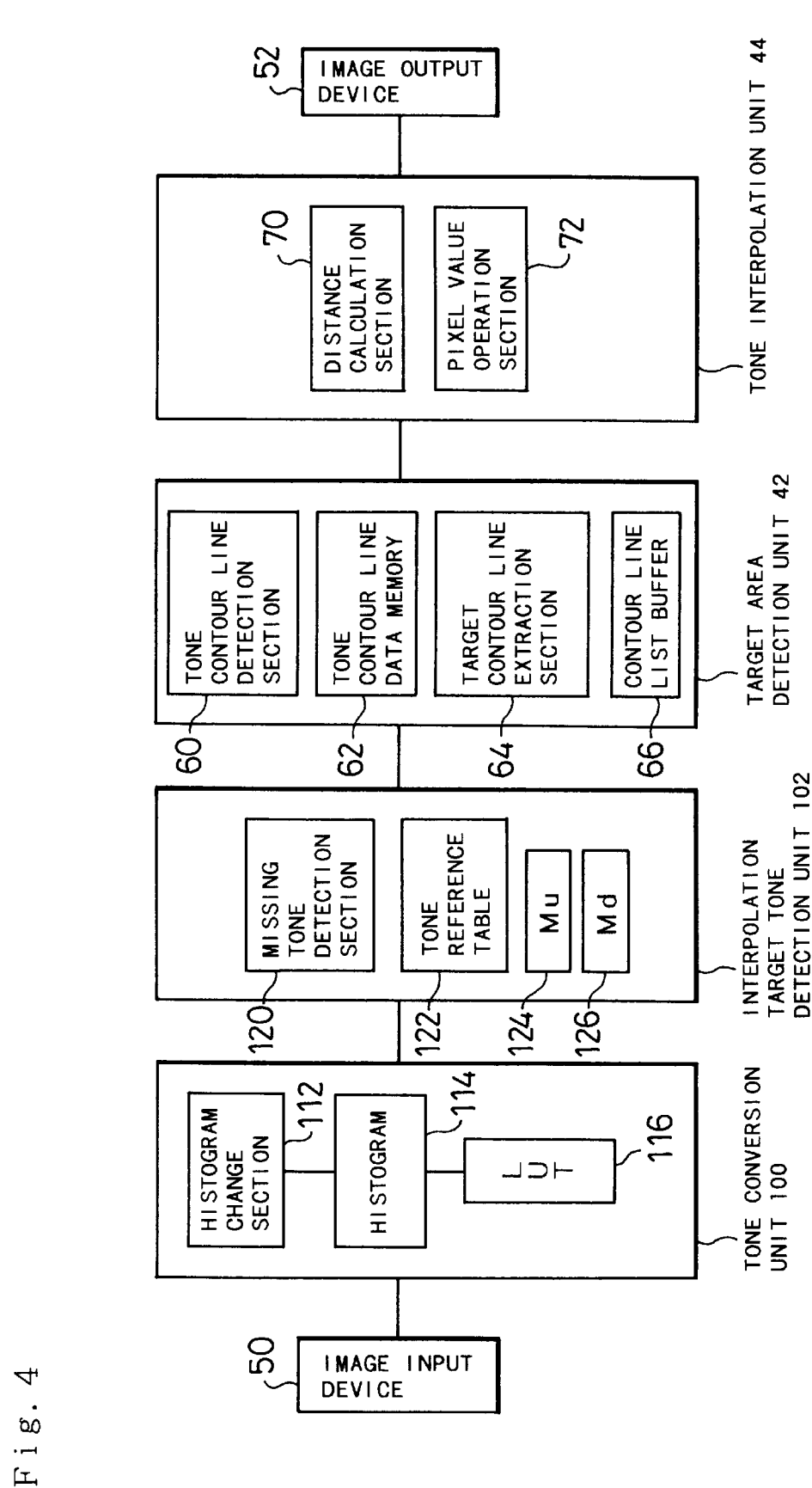
FIG. 4 is a functional block diagram showing the inner arrangements of the units 100, 102, 42, and 44.

FIG. 4 is a functional block diagram showing the functional blocks of the units 100, 102,42, and 44. The tone conversion unit 100 receives multi-tone image data from an image input device 50 and convert the tones of the multi-tone image data, thereby generating tone-converted image data. The interpolation target tone detection unit 102 identifies tone jumps included in the tone-converted image data and specifies the lower and upper image levels of the tone jumps. The target area detection unit 42 detects a target area for tone interpolation. More specifically, a set of contour lines surrounding the target area including the tone jump is extracted by the target area detection unit 42. The tone interpolation unit 44 executes tone interpolation with respect to each target area. The multi-tone image after the tone interpolation is output from an image output device 52. A read scanner can be used as the image input device 50, for example. As the image output device 52, the color CRT 36, a color printer, or the like can be used. Alternatively, the magnetic disk 38 can be used as an image input/output device.

The tone conversion unit 100 includes a histogram change section 112, a histogram 114, and a look-up table 116. The interpolation target tone detection unit 102 includes a missing tone detection section 120, a tone reference table 122, an upper marker 124, and an under marker 126. The target area detection unit 42 includes a tone contour line detection section 60, a tone contour line data memory 62, a target contour line extraction section 64, and a contour line loop buffer 66. The tone interpolation unit 44 includes a distance calculation section 70 and a pixel value operation section 72. The functions of these sections will be described later.

Computer programs (applications programs) for implementing the functions of the above units and sections are supplied by a portable storage medium such as a floppy disk or a CD-ROM to be transferred to a main memory or an external storage device of the computer system. The programs may also be supplied from a program supply device to the computer system through a communication path.

C. Processing of Embodiment

Figure 5:
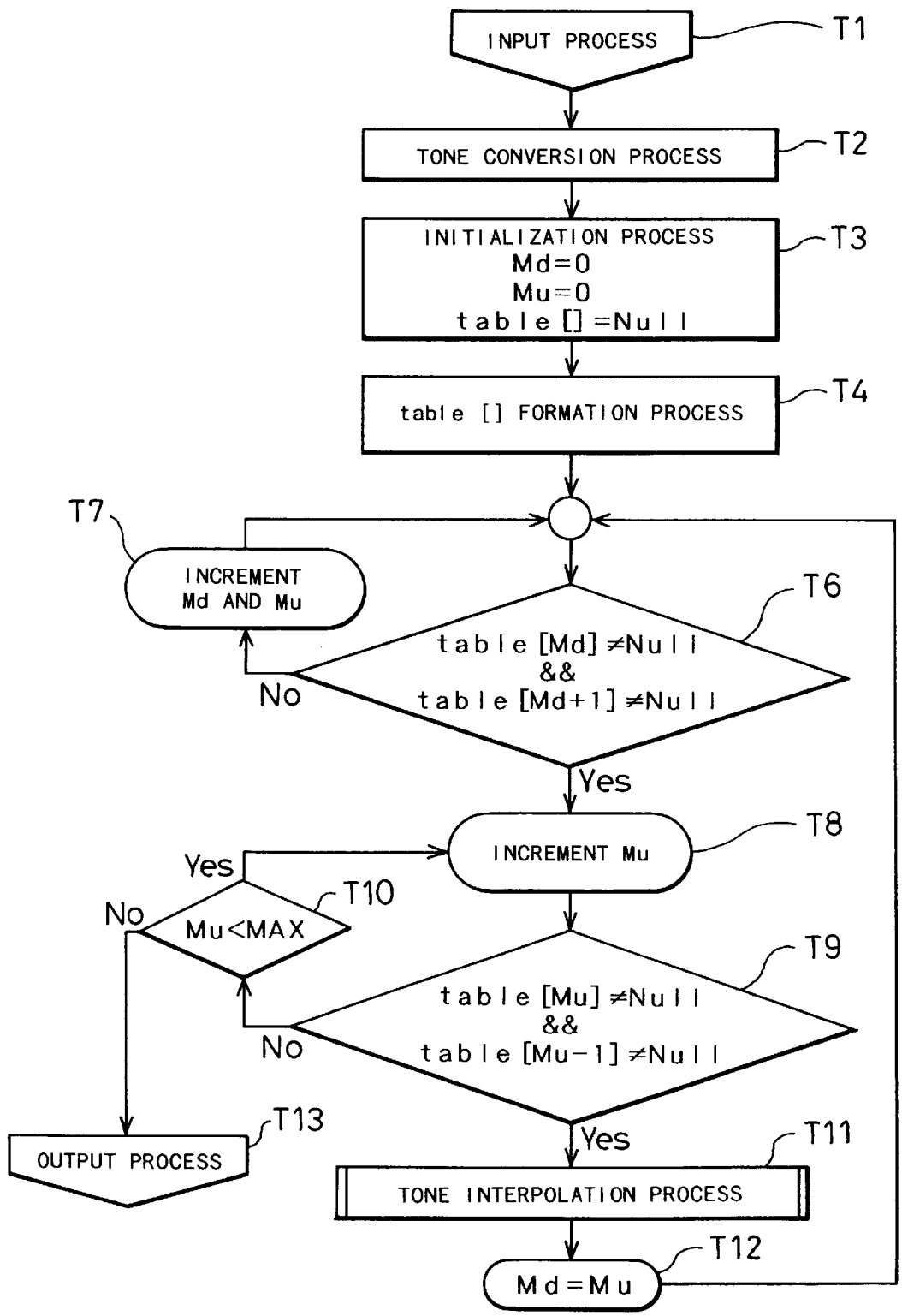
FIG. 5 is a flow chart showing a processing procedure in the embodiment.

FIG. 5 is a flow chart showing a processing procedure in the embodiment. The image input device 50 performs an input process of multi-tone image data in step T1, and the tone conversion unit 100 (FIG. 4) performs a tone conversion process in step T2.

FIGS. 6(a)–6(c) illustrate a tone conversion process through contrast correction using a histogram, and the contents of tone interpolation thereafter. FIG. 6(a) shows the histogram of an original multi-tone image data. This histogram is stored as the histogram 114 in the tone conversion unit 100. In the histogram of the original multi-tone image data shown in FIG. 6(a), a user specifies that a darkest point and a brightest point of a range subjected to tone conversion, and that these points Vls and Vhs are converted into Vld and Vhd (FIG. 6(b)), respectively. The tone conversion unit 100 produces the look-up table 116 for converting the tones of the multi-tone image data. The tone conversion characteristics expressed by the look-up table 116 are given by equation (1) described below, for example.

$$Vd = \frac{Vhd - Vld}{Vhs - Vls}Vs + \frac{Vld \cdot Vhs - Vls \cdot Vhd}{Vhs - Vls} \quad Vls \leq Vs \leq Vhs \quad (1)$$

where Vs is a pixel value before conversion, Vd is a pixel value after conversion, Vhs and Vls are the brightest point and the darkest point before conversion, and Vhd and Vld are the brightest point and the darkest point after conversion.

The conversion characteristics defined by Equation (1) is linear interpolation between the brightest point and the darkest point. As a matter of course, arbitrary conversion characteristics other than the linear interpolation can be defined by the look-up table 116. As a means for tone conversion, a means other than the look-up table can also be used. For example, a mathematical function representing tone conversion characteristics may be used in place of the look-up table. However, the look-up table has an advantage that tone conversion can be performed at a high speed.

The tone conversion on the original multi-tone image data shown in FIG. 6(a) will produce a tone-converted image data as shown in FIG. 6(b). The tone-converted image data has some tone jumps. Therefore, the units 102, 42, and 44 shown in FIG. 5 execute tone interpolation to produce multi-tone image data as shown in FIG. 6(c), which has interpolated tones.

FIGS. 7(a)–7(c) illustrate another example of contrast correction using a histogram. In this example, the brightest point Vhs and the darkest point Vls of the target range of contrast correction is specified in only a part of the histogram of the original multi-tone image data shown in FIG. 7(a). Therefore, only the pixel values Vs between these points Vhs and Vls are converted by the look-up table. At this time, as shown in FIG. 7(c), tone interpolation may be executed only on the values between the brightest point Vhd and the darkest point Vls after tone conversion.

The tone conversion unit 100 can perform not only the above contrast correction, but also a process called smoothing of a histogram. FIGS. 8(a)–8(c) illustrate results obtained by the smoothing process for a histogram performed by the histogram change section 112 (FIG. 4), and the contents of tone interpolation performed thereafter. The smoothing process for a histogram is a process in which allocation of pixel values at original pixel levels is determined in advance, and the pixel values are allocated to the respective pixels accordingly. Although there are some allocating methods, for example, the pixel values are sequentially allocated to the pixels in ascending (or descending) order of concentration. If the number of pixels exceeds the number of pixel values to be allocated, next concentrations (higher or lower pixel values) are allocated to the excessive pixel. The excessive pixels may be allocated with random values within the range of the predetermined pixel values. If the excessive pixels are left unallocated at all, a tone jump is generated in the multi-tone image. FIG. 8(b) shows tone-converted image data obtained as a result of the smoothing process. Since the tone-converted image data has tone jumps, tones are interpolated as shown in FIG. 8(c).

Conversion in which the number of pixel values to be allocated is equal to the number of pixels is also called averaging of a histogram.

The tone interpolation will be described in detail below to interpolate tone jumps caused by the tone conversion using the look-up table 116. The tone interpolation described below will be performed in almost the same manner even when the tone conversion is implemented through the histogram smoothing process by the histogram change section 112.

In step T3 in FIG. 5, an initializing process for the interpolation target tone detection unit 102 is performed. In this initializing process, an under marker Md and an upper marker Mu are initialized to 0, respectively, and all the elements of an array table[ ] of the tone reference table 122 are also initialized to 0, respectively. The tone reference table 122 is a one-dimensional array having an address which represents a tone value.

Figure 9:
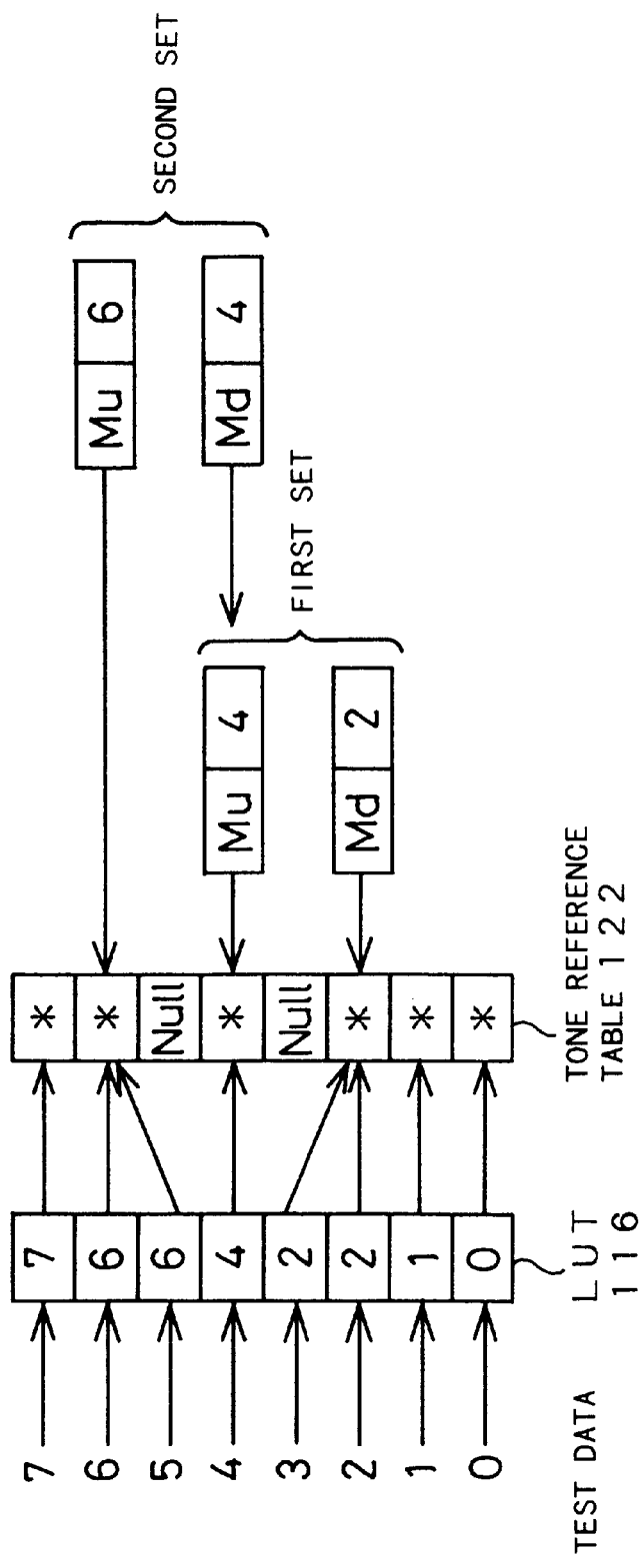
FIG. 9 illustrates the contents of a forming process of the tone reference table 122.

In step T4 in FIG. 5, the tone reference table 122 is produced. FIG. 9 is a view for explaining the contents of a forming process of the tone reference table 122. In the forming process of the tone reference table 122, all image levels (0 to 255 in case of 8-bit data) are input to the look-up table 116 as test data. A flag, which is indicated by "*" in FIG. 9, is registered in the tone reference table 122 at the level corresponding to an output level of the look-up table 116. The flag indicates that the output level is obtained from the look-up table 116. An image level written as "NULL" is where an output from the look-up table 116 is not present. Therefore, the "NULL" indicates a tone jump (missing tone) in the tone-converted data. The upper and lower image levels across the tone jump are used as A-level and B-level in the tone interpolation process.

As is understood from the process of producing the tone reference table 122 described above, the tone reference table 122 corresponds to all-levels conversion data in the present invention.

Steps T6 to T10 in FIG. 5 show a processing procedure in which the missing tone detection section 120 detects a tone jump which is present in the tone reference table 122, and the under marker Md and the upper marker Mu are specified with respect to the tone jump. In step T6, it is checked whether the value of the tone reference table 122 at the position indicated by the under marker Md is not "NULL," and whether the value at the next position of the under marker Md is "NULL." This checking operation is performed to ensure that the under marker Md indicates A-level (the lower level of the tone jump). As is apparent from FIG. 9, a flag "*" is registered in a certain image level immediately below the tone jump "NULL," and the array element of the missing tone just above the certain image level must be "NULL." Therefore, if the conditions in step T6 are confirmed, the level of the under marker Md indicates an image level (A-level) immediately below the tone jump. If the conditions in step T6 are denied, the under marker Md and the upper marker Mu are incremented by 1, respectively, to execute step T6 again. On the other hand, if the conditions in step T6 are confirmed, the process proceeds to step T8. In the example in FIG. 9, the conditions in step T6 are confirmed when the under marker Md is 2, and the flow of the procedure goes to step T8.

In step T8 in FIG. 5, the upper marker Mu is incremented by 1. In step T9, it is checked whether the value of the tone reference table 122 at the position of the upper marker Mu is not "NULL," and the value at the previous position of the upper marker Mu is "NULL." This checking operation is performed to ensure that the upper marker Mu indicates B-level (the upper level of the tone jump). As is apparent from FIG. 9, a flag "*" is registered in a certain image level immediately above the tone jump "NULL," and the array element for the missing tone just below the certain image level must be "NULL." Therefore, if the conditions in step T9 are confirmed, the level of the upper marker Mu indicates an image level (B-level) immediately above the tone jump. If the conditions in step T9 are denied, it is checked in step T10 whether the upper marker Mu is smaller than the maximum possible value Max of the image level. When the upper marker Mu is smaller than the maximum value Max, the flow returns to step T8, and the upper marker Mu is incremented by 1. On the other hand, when the upper marker Mu is equal to or larger than the maximum value Max, the whole tone interpolation process are completed, and the image data after tone interpolation is output to the image output device 52 (FIG. 4). If the conditions in step T9 are confirmed, the value of the present upper marker Mu is employed. In next step T11, a tone interpolation process to be described later is executed using the under marker Md specified in step T6 and the upper marker Mu specified in step T9.

In the example shown in FIG. 9, the first tone interpolation process is performed using Md=2 and Mu=4 according to the processing procedure in FIG. 5. When the tone interpolation process is completed, in step T12 in FIG. 5, the value of the under marker Md is set to be equal to that of the upper marker Mu. Returning to step T6, detection of the next tone jump and a tone interpolation process are performed. In the example in FIG. 9, the second tone interpolation process is performed using Md=4 and Mu=6. In this manner, according to the procedure in FIG. 5, one set of markers {Md, Mu} is determined to each tone jump which is present in the tone reference table 122, and the tone interpolation is executed using these markers.

D. Detail of Tone Interpolation Process

Figure 10:
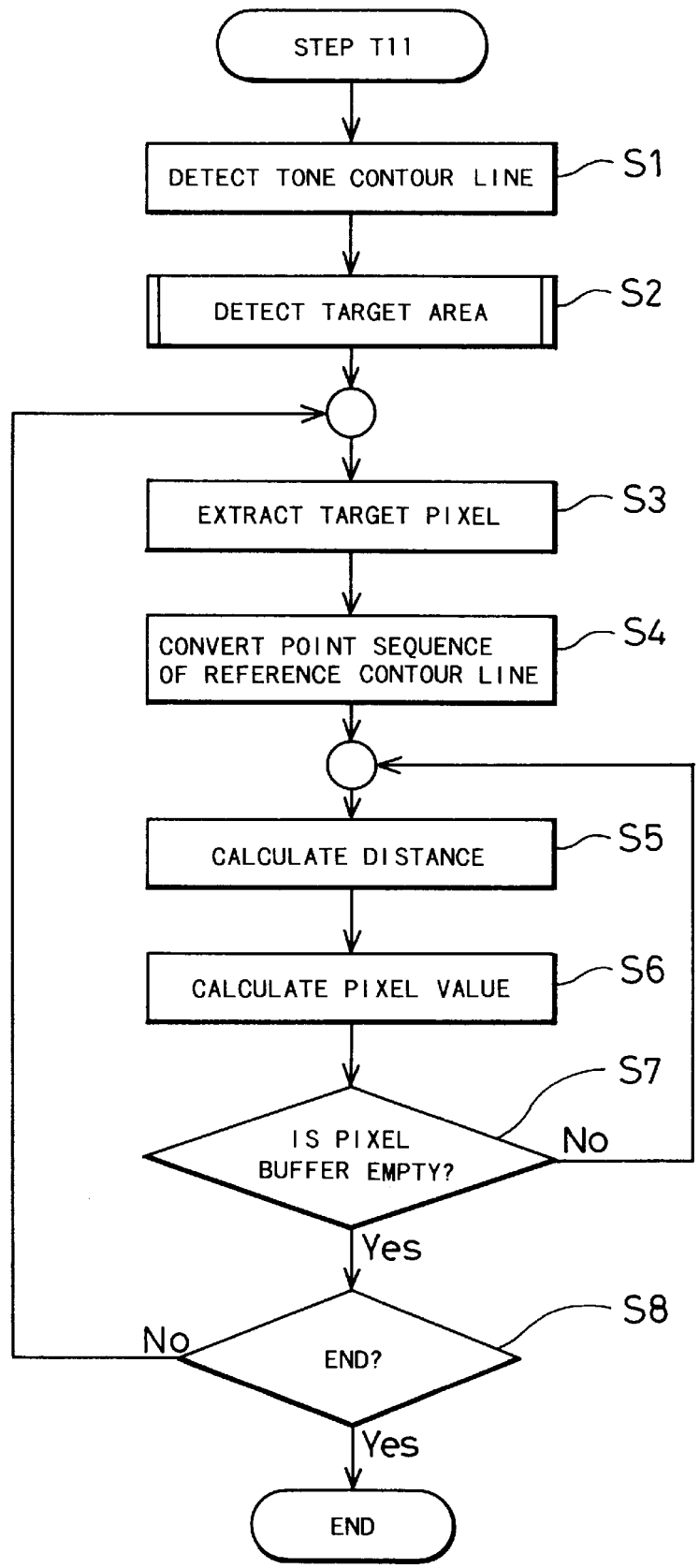
FIG. 10 is a flow chart showing the processing procedure of tone interpolation in the embodiment.

FIG. 10 is a flow chart showing the processing procedure of tone interpolation in step T11 in FIG. 5. In step S1, the tone contour line detection section 60 (FIG. 4) processes multi-tone image data (tone-converted image data) after tone conversion to detect tone contour lines included in the multi-tone image. FIGS. 11(a)–11(c) illustrate an entire multi-tone image subjected to the process in the embodiment, and the tone contour lines detected in step S1. The multi-tone image shown in FIG. 11(b) is divided into sixth areas R1 to R6. In this example, the contours of the areas are indicated by rectangles for illustrative convenience. The same processes as described below are performed even if the contours of the areas have arbitrary shapes.

FIG. 11(c) shows a change in image level on a line passing through the center of the multi-tone image. In FIG. 11(b), areas of the same type of hatching have an identical image level. As is understood from FIG. 11(b), the areas R1 and R4 have A-levels, respectively, and the area R3 has B-level. B-level is an image level which is higher than A-level by 2. More specifically, there is one tone jump between A-level and B-level. The areas R2 and R5 have levels lower than A-level, respectively, and an area R6 has a C level, which is higher than B-level.

As illustrated in FIG. 9 described above, A-level is indicated by the under marker Md, and B-level is indicated by the upper marker Mu.

FIG. 11(a) shows the tone contour lines L1 to L6 detected in step S1 in FIG. 10. FIGS. 12(a), 12(b-1)–12(b-2), and 12(c-1)–12(c-2) illustrate the procedure for detecting the tone contour lines L1–L6 from the multi-tone image. First, the multi-tone image data shown in FIG. 12(*a*) is binarized at A-level to obtain a binary image shown in FIG. 12(*b*-1). The binary image in FIG. 12(*b*-1) includes a 1 level area obtained by summing the areas R1, R3, R4 and R6 whose level is equal to or larger than A-level, and 0 level areas whose original level is lower than A-level. Three tone contour lines L1, L2, and L5 shown in FIG. 12(*b*-2) are detected in the binary image. In this embodiment, the tone contour lines L1, L2, and L5 detected in the binary image binarized at A-level are called "A-type contour lines." The "A-type contour lines" indicate boundaries between A-level image areas and other image areas whose level is lower than A-level.

The A-type contour lines L1, L2, and L5 are classified into "$A^+$-type contour lines" and "$A^-$-type contour lines." The $A^+$-type contour line is defined to have an inner area whose image level is equal to or higher than A-level, i.e., a contour line whose inner area is filled in the binary image. In the example in FIG. 12(*b*-2), the contour line L1 is an "$A^+$-type contour line." The "$A^-$-type contour line" is defined to have an inner area whose image level is lower than A-level, i.e., a contour line whose inner area is not filled in the binary image. In the example in FIG. 12(*b*-2), the contour lines L2 and L5 are "$A^-$-type contour lines."

The method of detecting contour lines in a binary image is described in U.S. Pat. No. 5,379,350, the disclosure of which is herein incorporated by reference.

In this embodiment, the $A^+$-type contour line L1 is detected as a clockwise closed-loop contour. On the other hand, the $A^-$-type contour lines L2 and L5 are detected as counterclockwise closed-loop contours. Therefore, when the closed-loop contour lines L1, L2, and L5 are detected, whether each contour line is of an $A^+$-type or an $A^-$-type can be determined by checking the rotational direction (clockwise or counterclockwise) of the contour line.

The multi-tone image data shown in FIG. 12(*a*) is also binarized at B-level to produce a binary image shown in FIG. 12(*c*-1). Three B-level tone contour lines L3, L4, and L6 shown in FIG. 12(*c*-2) are detected in the binary image. These tone contour lines L3, L4, and L6 are classified into $B^+$-type and $B^-$ type contour lines as shown in FIG. 12(*c*-1). The "$B^+$-type contour line" is defined to have an inner area whose image level is equal to or higher than B-level, i.e., a contour line whose inner area is filled in the binary image. The "$B^-$-type contour line" is defined to have an inner area whose image level is lower than B-level, i.e., a contour line whose inner area is not filled in the binary image.

Figure 13:
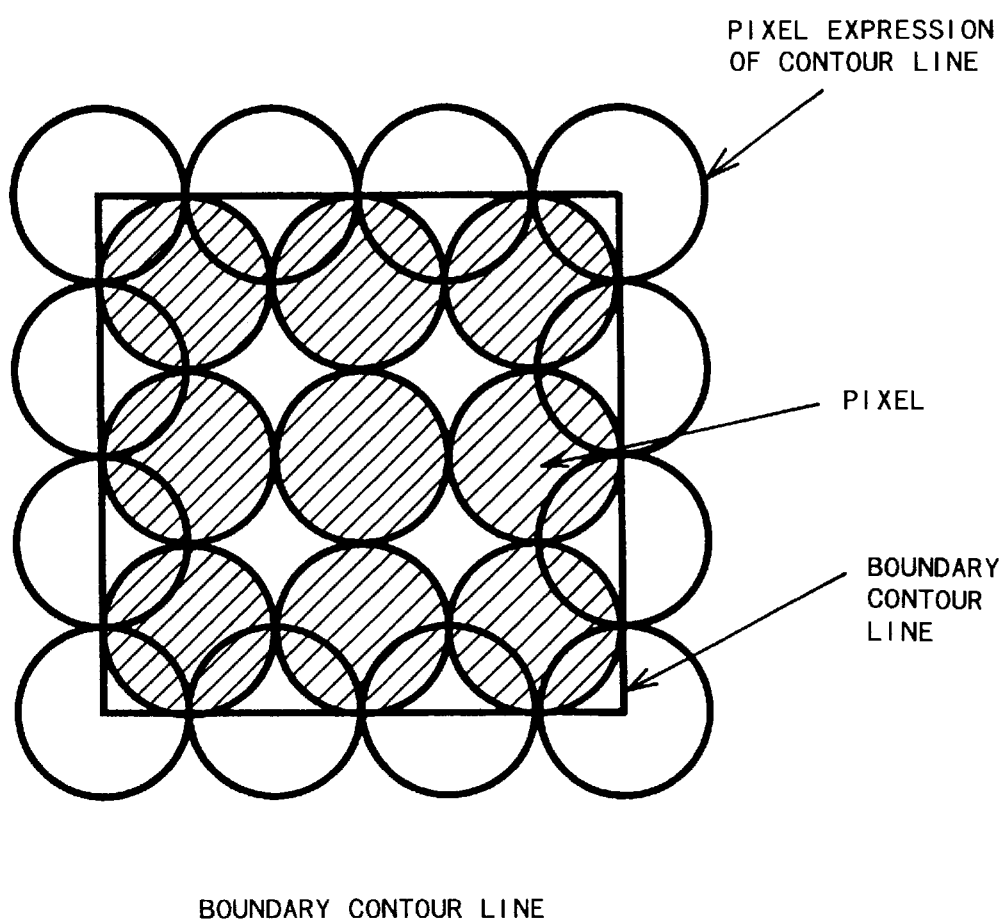
FIG. 13 illustrates the relationship between pixels and a boundary contour line.

The tone contour lines detected according to the method described in the above stated U.S. Pat. No. 5,379,350 are boundary contour lines which are drawn along boundaries between pixels. FIG. 13 illustrates the relationship in between pixels and a boundary contour line. The boundary contour line passes through a boundary between pixels (hatched circles). For this reason, the boundary contour line can correctly represent a boundary of an area having one-pixel width. A position on the boundary contour line is set at the center of a circle which is labeled "pixel expression of contour line" in FIG. 13. Therefore, the position on the boundary contour is shifted from the pixel position in the vertical direction (main-scanning direction) and the horizontal direction (sub-scanning direction) by half a pixel pitch. In an interpolation process described later, the distance from each position of the contour line to each pixel is calculated in order to obtain the minimum distance between the contour line and the pixels in a target area.

Contour data representing the tone contour lines L1–L6 (FIG. 11(*a*)) detected as described above are stored in the tone contour line data memory 62 (FIG. 4). In step S2 in FIG. 10, the target contour line extraction section 64 detects a target area for the tone interpolation process, and a set of contour lines constituting the boundary of the target area are extracted. FIGS. 14(*a*-1)–(*a*-4) and 14(*b*-1)–14(*b*-4) show various areas defined by different sets of contour lines. There are eight kinds of sets shown in FIGS. 14(*a*-1)–14(*a*-4) and FIGS. 14(*b*-1)–14(*b*-4), which can be used as a set of contour lines constituting the boundary of an A-level area.

FIG. 14(*a*-1) shows an area defined by a single $A^+$-type contour line. FIGS. 14(*a*-2)–14(*a*-4) show the areas which are defined by an $A^+$-type contour line as well as at least one of an $A^-$-type contour line and a $B^+$-type contour line. The tone interpolation is necessary for the two cases shown in FIGS. 14(*a*-3) and 14(*a*-4) among the four cases shown in FIGS. 14(*a*-1)–14(*a*-4). More specifically, an A-level area which is inside the $A^+$-type contour line and outside the $B^+$-type contour line is detected as a target area for the tone interpolation. As shown in FIG. 14(*a*-4), an $A^-$-type contour line is sometimes surrounded by an $A^+$-type contour line. Such an $A^-$-type contour line is also detected as a part of a set of contour lines defining the target area. In other words, in case of FIG. 14(*a*-3), the $A^+$-type and $B^+$-type contour lines are extracted as one set of contour lines constituting the boundaries between the target area and the other areas. In case of FIG. 14(*a*-4), the $A^+$-type, $B^+$-type, and $A^-$-type contour lines are extracted as one set of contour lines constituting the boundaries between the target area and the other areas.

FIG. 14(*b*-1) shows an area defined by a single $B^-$-type contour line. FIGS. 14(*b*-2) to 14(*b*-4) show areas defined by a $B^-$-type contour line as well as at least one of $B^+$-type and $A^-$-type contour lines. The tone interpolation is necessary for the two cases shown in FIGS. 14(*b*-3) and 14(*b*-4) among the four cases shown in FIGS. 14(*b*-1)–14(*b*-4). More specifically, an A-level area which is inside the $B^-$-type contour line and outside the $A^-$-type contour line is detected as a target area for tone interpolation. As shown in FIG. 14(*b*4), a $B^+$-type contour line is sometimes surrounded by a $B^-$-type contour line. The $B^+$-type contour line is also detected as a part of a set of contour lines defining the target area. In other words, in case of FIG. 14(*b*-3), $B^-$-type and $A^-$-type contour lines are extracted as one set of contour lines constituting the boundaries between the target area and the other areas. In case of FIG. 14(*b*-4), $B^-$-type, $A^-$-type, and $B^+$-type contour lines are extracted as one set of contour lines constituting the boundaries between the target area and the other area.

Figure 15:
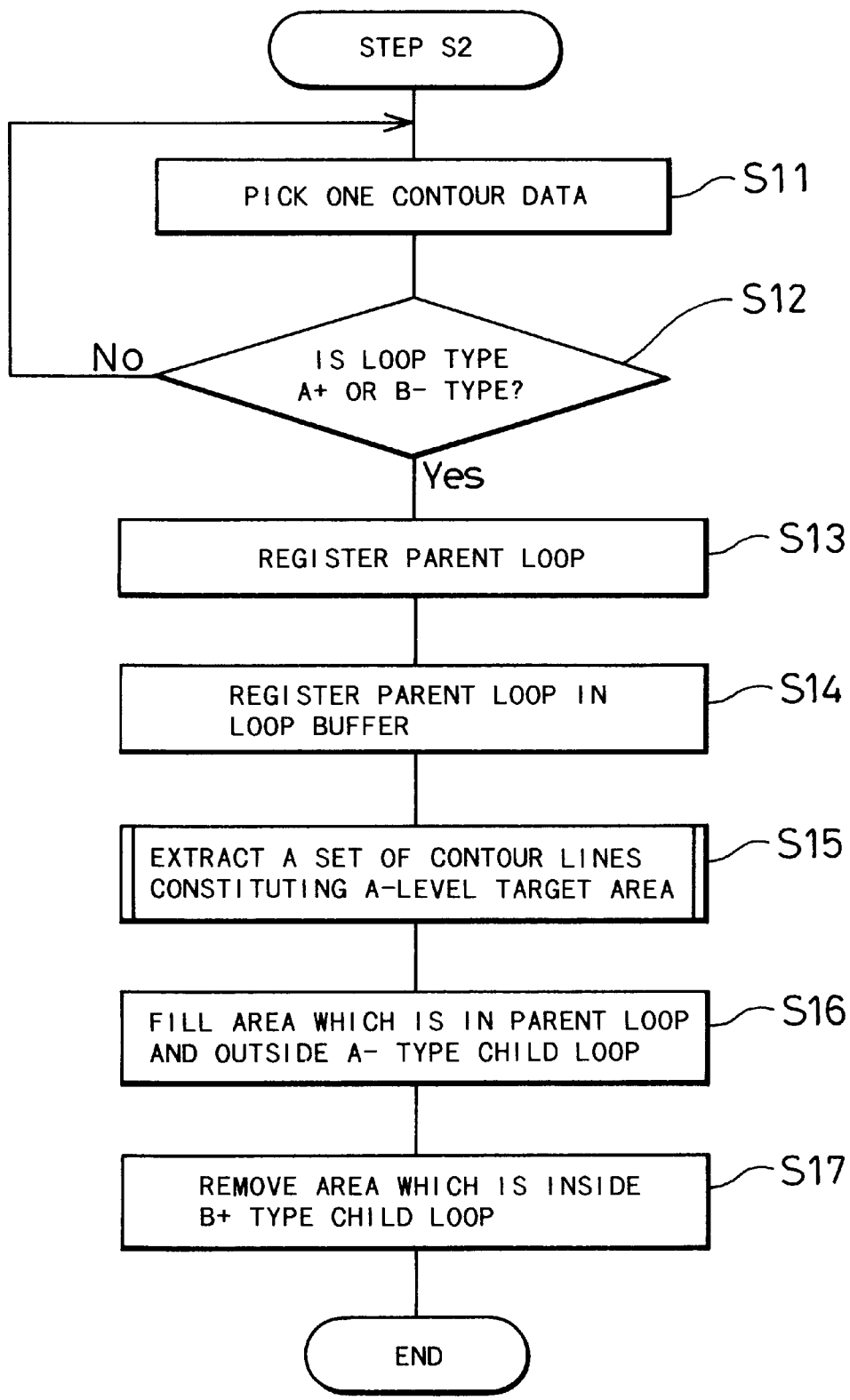
FIG. 15 is a flow chart showing a detailed procedure of step S2.

FIG. 15 is a flow chart showing a detailed procedure of step S2 in FIG. 10. In step S11, one contour data (contour line) is picked from the tone contour line data memory 62. It is checked in step S12 whether the picked contour line is of an $A^+$-type or a $B^-$-type, so that a contour line constituting the circumference of a target area is extracted. The $A^+$-type contour line may constitute the circumference of the target area as in FIG. 14(*a*-3) or 14(*a*-4). The $B^-$-type contour line may constitute the circumference of the target area as in FIG. 14(*b*-3) or 14(*b*-4). In contrast, the $A^-$-type or $B^+$-type contour lines are not used as contour lines constituting the circumference of the target area. For this reason, if the picked contour is of $A^-$-type or $B^+$-type, the flow returns from step S12 to step S11 to pick the next contour data. On the other hand, when the picked contour line is of an $A^+$-type or $B^-$-type, the contour line is registered as a parent loop (step S13). Here, the "parent loop" means a contour line constituting the circumference of a target area for tone interpolation. In this embodiment, since each tone contour line constitutes a closed loop, a contour line is simply called a "loop." The contour data of the parent loop is registered in the contour line loop buffer 66 (step S14). In the example using the contour lines L1–L6 shown in FIG. 11(a), since the first contour line L1 is of an $A^+$type, the contour line L1 is registered in the contour line loop buffer 66 as a parent loop.

Figure 16:
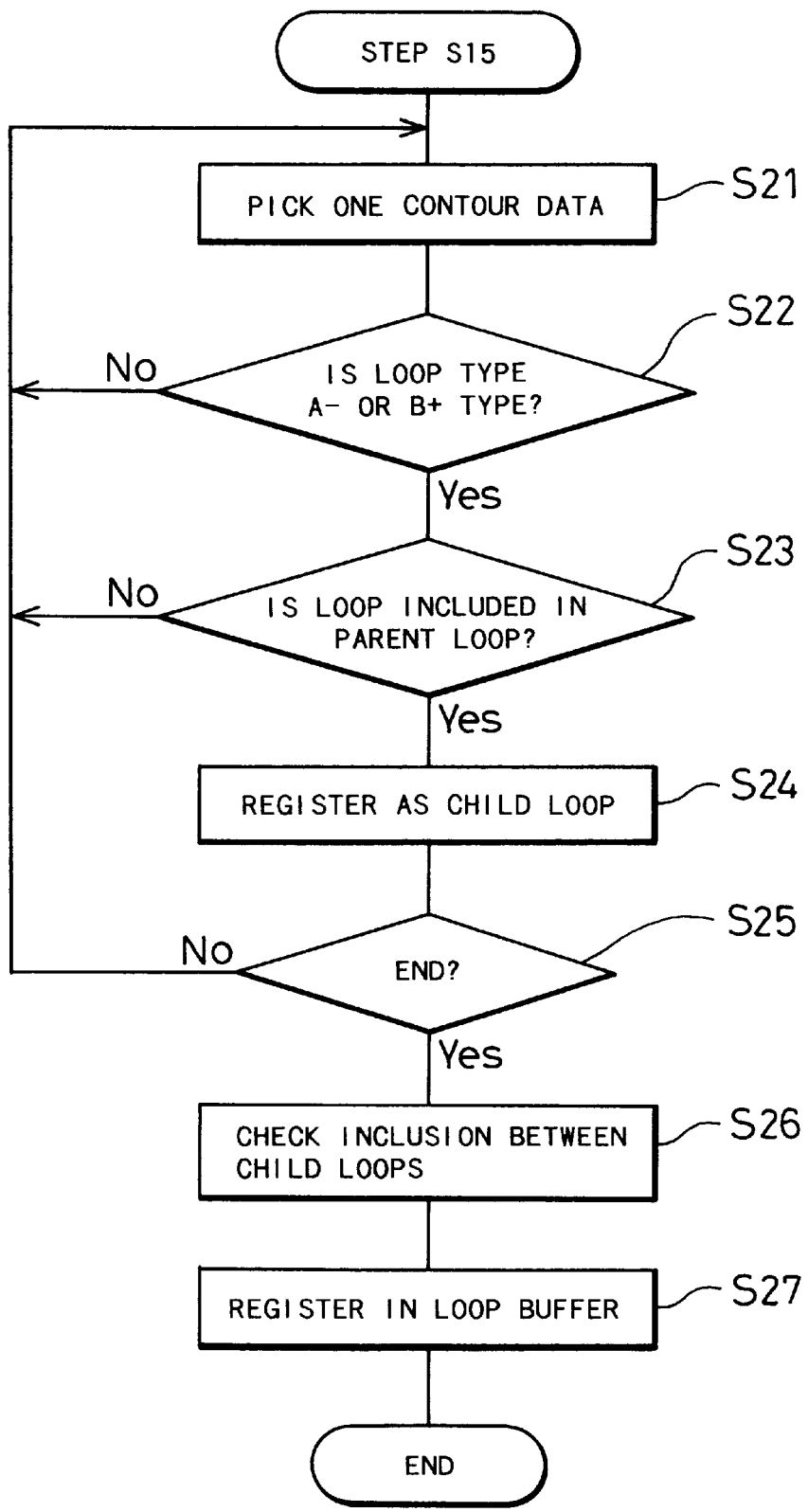
FIG. 16 is a flow chart showing the detailed procedure of step S15.

In step S15, a set of contour lines defining an A-level target area is extracted. FIG. 16 is a flow chart showing the detailed procedure of step S15. In step S21, one contour data is picked from the tone contour line data memory 62. In this case, the contour data registered as a present parent loop and the contour data which has been extracted before as a set of contour lines constituting a target area are excluded.

Steps S22 to S25 show a processing procedure for extracting a contour line (called a "child loop") included in the parent loop. In step S22, it is checked whether the type of the extracted contour line is an $A^-$-type or a $B^+$-type. This is because, when the target area for tone interpolation is as shown in FIG. 14(a-3) or 14(a-4), only $A^-$-type and $B^+$-type contour line are to be combined with the parent loop ($A^+$-type contour line) to produce a contour line set, and similarly in the cases shown in FIGS. 14(b-3) and 14(b-4), only $A^-$-type and $B^+$-type contour lines are to be combined with the parent loop ($B^-$-type contour line) to produce a contour line set. When the picked contour is an $A^-$-type or a $B^+$-type, it is checked in step S23 whether the contour is included or surrounded by the parent loop.

FIG. 17 is a view for explaining a determination procedure for an inclusive relationship between contour lines. In this embodiment, the inclusive relationship between contour lines is judged by a two-step procedure shown in FIGS. 17(a) and 17(b). In FIG. 17(a), the inclusive relationship is determined according to the range of the circumscribed rectangle of each contour line. More specifically, when the circumscribed rectangle of an $A^-$-type or $B^+$-type contour line is included in the circumscribed rectangle of the parent loop, it is determined that there is probability of inclusion. This determination can be easily made by comparing the coordinate ranges of circumscribed rectangles with each other. When there is probability of inclusion, inclusion determination using a half-line method shown in FIG. 17(b) is executed. In this half-line method, a half line is drawn in an arbitrary direction from one point on a contour line which may be included in the parent loop, and an inclusive relationship is determined when the half line crosses the parent loop odd-number times, and no inclusive relationship is determined when the half line crosses the parent loop even-number times. As a matter of course, the inclusive relationship between each picked contour line and the parent loop may be judged by another method other than the method shown in FIGS. 17(a) and 17(b).

When it is determined that the picked contour line is included in the parent loop, in step S24 in FIG. 16, the picked contour line is registered in the contour line loop buffer 66 as a child loop. Therefore, the flow returns from step S25 to step S21, and the processes in steps S21 to S24 are repeated for all the contour lines. In this manner, all the child loop included in the present parent loop are registered.

In step S26, inclusive relationship is checked between each of the child loops registered with respect to a present parent loop according to the method in FIGS. 17(a) and 17(b). Since a child loop included in another child loop (that is, a grandchild loop) does not constitute the boundaries between the target area and the other areas, the grandchild loop is excluded from child loops. In this manner, the contour data of the child loops thus left are registered in the contour line loop buffer 66 (step S27).

Figures 18B, 18C:
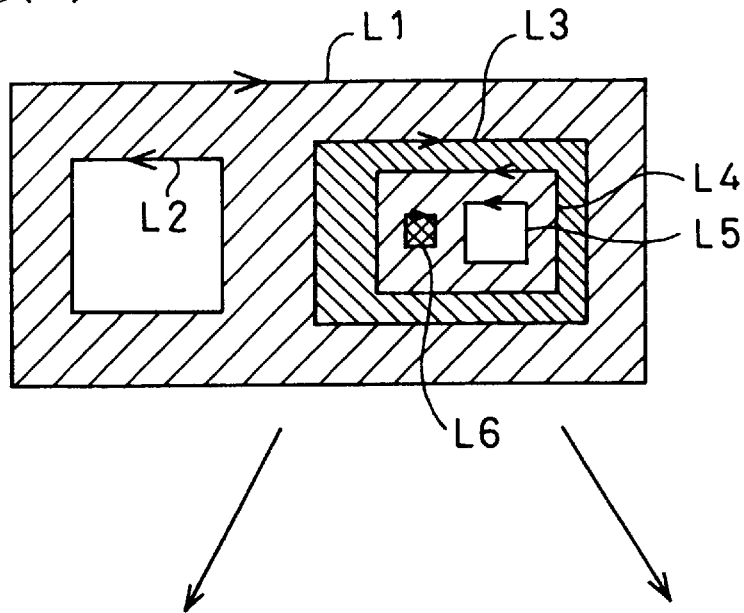

FIGS. 18(a)–18(c) illustrate two sets of contour lines registered as the result of the processes in FIG. 16. FIG. 18(b) shows the first set of contour lines having a contour line L1 as a parent loop, and having two contour lines L2 and L3 as child loops which are directly included in the contour line L1. FIG. 18(c) shows the second set of contour lines having a contour line L4 as a parent loop, and having two contour lines L5 and L6 as child loops which are directly included in the contour line L4. When the first set of contour line is detected, contour data $D_{L1}$ of the $A^+$-type parent loop L1 and contour data $D_{L2}$ of the $A^-$-type child loop L2 are registered in an A-loop buffer 66a in the contour line loop buffer 66. Contour data $D_{L3}$ of the $B^+$-type child loop L3 is registered in a B-loop buffer 66b. On the other hand, when the second set of contour lines is set, contour data $D_{L5}$ of the $A^-$-type tone contour line L5 is registered in the A-loop buffer 66a in the contour line loop buffer 66. Contour data $D_{L4}$ of the $B^-$-type parent loop L4 and contour data $D_{L6}$ of the $B^+$-type child loop L6 are registered in the B-loop buffer 66b. As will be described later, when distance calculation is performed on a target area for tone interpolation, the minimum distance from A-type ($A^+$-type and $A^-$-type) contour lines to each pixel of the target area is calculated, and so is the minimum distance from B-type ($B^+$-type and $B^-$-type) contour lines to each pixel of the target area. In other words, in the distance calculation, the $A^+$-type and the $A^-$-type are not discriminated from each other, and the $B^+$-type and $B^-$-type are not discriminated from each other. Therefore, contour data are classified into A-type and B-type data to be registered in the contour line loop buffer 66.

As described above, discrimination between the $A^+$-type and the $A^-$-type contours and discrimination between the $B^+$-type and the $B^-$-type contours are important in extracting a set of contour lines constituting the boundaries between the target area and the other areas.

When a set of contour lines defining the target area for tone interpolation is extracted, the flow proceeds to step S16 in FIG. 15. In step S16, an area outside an $A^-$-type child loop and inside the parent loop is filled with 1 level. In step S17, the inner area of the $B^+$-type child loop is removed from the area filled in step S16. FIGS. 19(a)–19(c) schematically illustrate the process of steps S16 and S17. FIGS. 19(a)–19(c) show a case using the first set of contour lines shown in FIG. 18(b). When an area which is inside the parent loop L1 ($A^+$-type) and outside the $A^-$-type child loop L2 is filled with 1 level, a bit map image shown in FIG. 19(b) is obtained. The area inside the $B^+$-type child loop L3 is then removed (set at 0 level) to produce a bit map image shown in FIG. 19(c). In this manner, a binary bit map image in which the target area for tone interpolation is filled is obtained. The bit map image of the target area thus obtained is temporarily stored in the RAM 16. In this manner, the step of detecting the target area in step S2 in FIG. 10 is completed.

Figure 20:
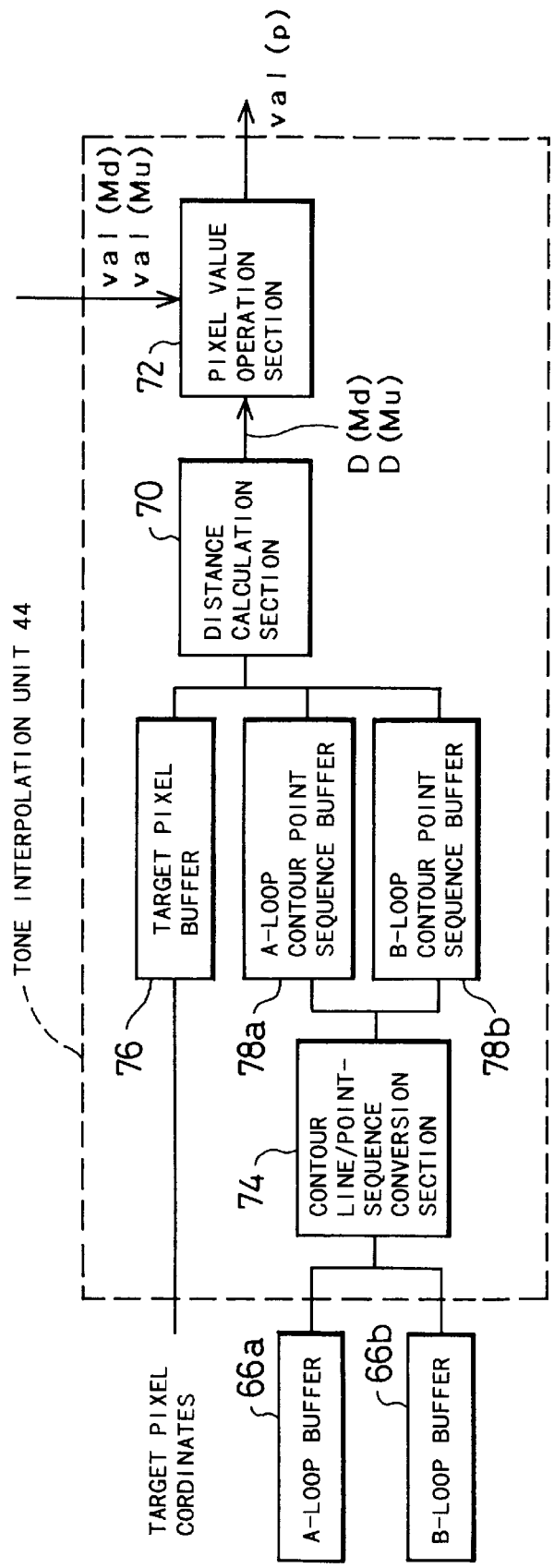
FIG. 20 is a functional block diagram showing the function of the tone interpolation unit 44.

In steps S3 to S8 in FIG. 10, the tone interpolation unit 44 (FIG. 4) executes tone interpolation with respect to each target area. FIG. 20 is a functional block diagram showing the functions of the tone interpolation unit 44. The tone interpolation unit 44 has, in addition to the distance calculation section 70 and the pixel value operation section 72, a contour line/point-sequence conversion section 74, a target pixel buffer 76, an A-loop contour point-sequence buffer 78a, and a B-loop contour point-sequence buffer 78b.

In step S3 in FIG. 10, the coordinates of pixels in the target area are extracted from the bit map image of FIG. 19(c), and are serially stored in the target pixel buffer 76 (FIG. 20). In step S4, the contour data (see FIGS. 18(b) and 18(c)) stored in the A-loop buffer 66a and the B-loop buffer 66b are converted into point-sequence coordinates by the contour line/point-sequence conversion section 74, and the point-sequence coordinates are stored in the A-loop contour point-sequence buffer 78a and the B-loop contour point-sequence buffer 78b, respectively. The "point sequence of contour line" means a sequence of points shown as "pixel expression of contour line" in FIG. 13. The "point-sequence coordinates" denote coordinates of the points in the sequence.

In step S5 in FIG. 10, the distance calculation section 70 selects coordinates of one pixel from the target pixel buffer 76 to calculate a minimum distance D (Md) from an A-loop point sequence to the selected pixel and a minimum distance D (Mu) from a B-loop point sequence to the selected pixel. Here, the symbol "D(Md)" means that the minimum distance is measured from the point sequence indicative of an image level of the under marker Md (indicating A-level), and "D(Mu)" means that the minimum distance is measured from the point sequence indicative of an image level of the upper marker Mu (indicating B-level).

In step S6 in FIG. 10, the pixel value operation section 72 calculates a pixel value val(p) at a current pixel position according to Equation (2).

$$val(p) = val(md) + \frac{\{val(Mu) - val(Md)\} \times D(Md)}{D(Md) + D(Mu)} \quad (2)$$

where val(Md) denotes a value indicated by the under marker Md, and val(Mu) denotes a value indicated by the upper marker Mu; in other words, val(Md)=A-level and val(Mu)=B-level.

In general, B-level is higher than A-level by N+1), and Equation (2) is rewritten into Equation (3).

$$val(p) = A + \frac{(N+1) \times D(Md)}{D(Md) + D(Mu)} \quad (3)$$

In this embodiment, since B=A+2, N=1. An integer part of the second term of the right-hand side of Equation (3) is added to A-level of the first term. If N=1, the second term of the right-hand side becomes 0 at a pixel position at which the minimum distance D(Md) to the A-type loop is smaller than half the sum of the two minimum distances (D(Md)+D(Mu)), and the pixel value val(p) is equal to A-level accordingly. At a pixel position at which the minimum distance D(Md) to the A-loop is equal to or larger than half the sum of the minimum distances (D(Md)+D(Mu)), the second term of the right-hand side becomes 1, and the pixel value val(p) becomes (A+1) level.

Figure 21A:
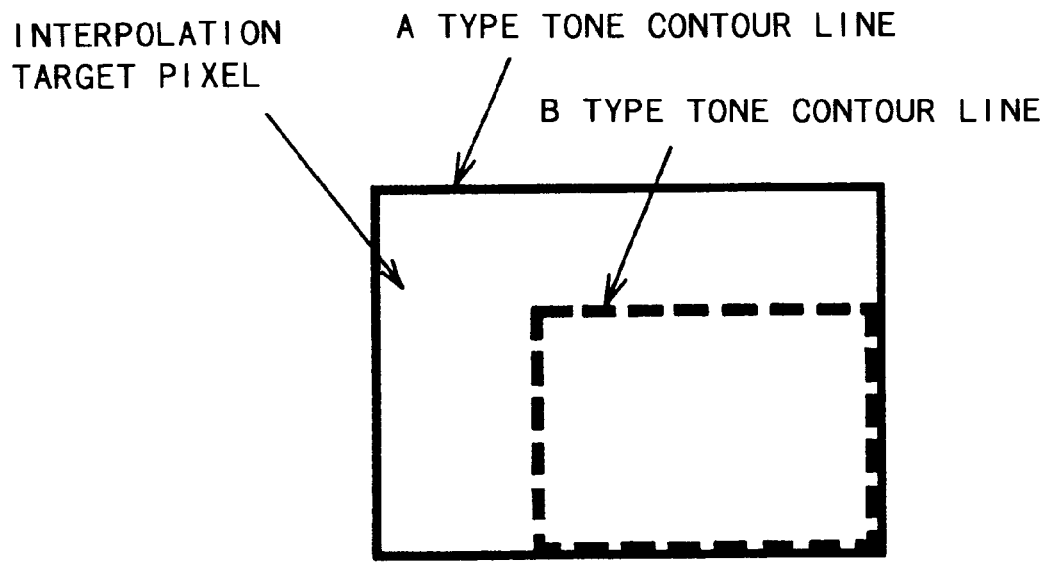
FIGS. 21(a) and 21(b) show a contour line portion referred to in distance calculation.
Figure 21B:
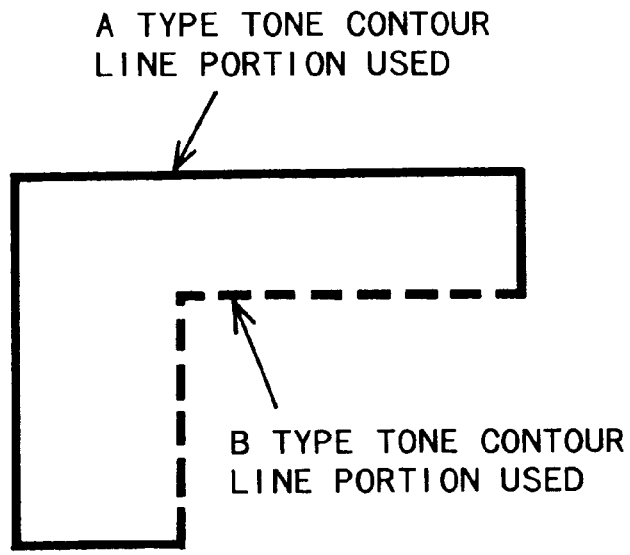

As shown in FIG. 21(a), when an A-loop partially overlaps a B-loop, the point sequences of the overlapping portion are canceled out as shown in FIG. 21(b), only the point sequences of the portions which do not overlap are used in distance calculation. In this manner, the processing time for distance calculation can be shortened.

FIGS. 22(a) and 22(b) illustrate the distributions of pixel values val(p) obtained with respect to the first and second sets of contour lines shown in FIGS. 18(b) and 18(c). As is apparent from FIGS. 22(a) and 22(b), the target area having A-level is divided into two divided areas by a virtual contour line Lint located at a position having equal distances to the A-loop and the B-loop. The divided area closer to the B-level area is set at (A+1) level, and the other area is kept at A-level. As is understood from the above description, in this embodiment, contour data representing an intermediate contour line constituting the boundary between an A-level divided area and an (A+1)-level divided area is not actually generated, but the target area is divided into an A-level divided area and an (A+1)-level divided area by the virtual intermediate contour line Lint. In general, when N intermediate levels between A-level and B-level are interpolated, the target area is divided into N+1 divided areas, and these divided areas can be sequentially filled to have N+1 levels from A-level to (A+N) level. In this case, the virtual intermediate contour if lines Lint are generated at the positions where the minimum distances to the A-loop and to the B-loop have a ratio of m:n, where m and n are integers satisfying 1≦m≦N and 1≦n≦N, and N combinations of m and n satisfy m+n=N+1.

As a matter of cause, contour data can be actually produced which represent N intermediate contour lines for dividing the target area into N+1 divided areas, and levels may be allocated to the divided areas divided by these intermediate contour lines. In this invention, "forming intermediate contour lines" means not only that contour data representing the intermediate contour lines is actually produced, but also, as in the embodiment, divided areas are divided by the virtual intermediate contour lines as the result of calculation of pixel values according to the above Equation (2) or Equation (3).

In this manner, steps S5 and S6 in FIG. 10 are repeatedly executed until no data is left in the target pixel buffer 76 (FIG. 20), thereby producing interpolated multi-tone image data representing an interpolated image where the interpolation is done with respect to the target area defined by one set of contour lines. The flow proceeds from step S8 to S3, and the process with respect to the next set of contour lines is repeated. The multi-tone image data representing the target area after the interpolation is overwritten on the target area portion of the original multi-tone image data.

FIGS. 23(a) and 23(b) illustrate a result obtained by interpolating the tones of another multi-tone image. FIG. 23(a) shows the multi-tone image before interpolation, and FIG. 23(b) shows the multi-tone image after interpolation. In the multi-tone image shown in FIG. 23(a), a plurality of B-level areas are included in an A-level target area. In this case, when tones are interpolated according to the procedure shown in FIG. 10, as shown in FIG. 23(b), an area having an intermediate tone (i.e., A+1 level) is formed to include all the plurality of B-level areas. As a result, tone interpolation can be performed more naturally than the conventional tone interpolation. The same advantage as described above can be obtained when tone interpolation is generally performed such that N intermediate image levels between A-level and B-level are interpolated.

Figure 24:
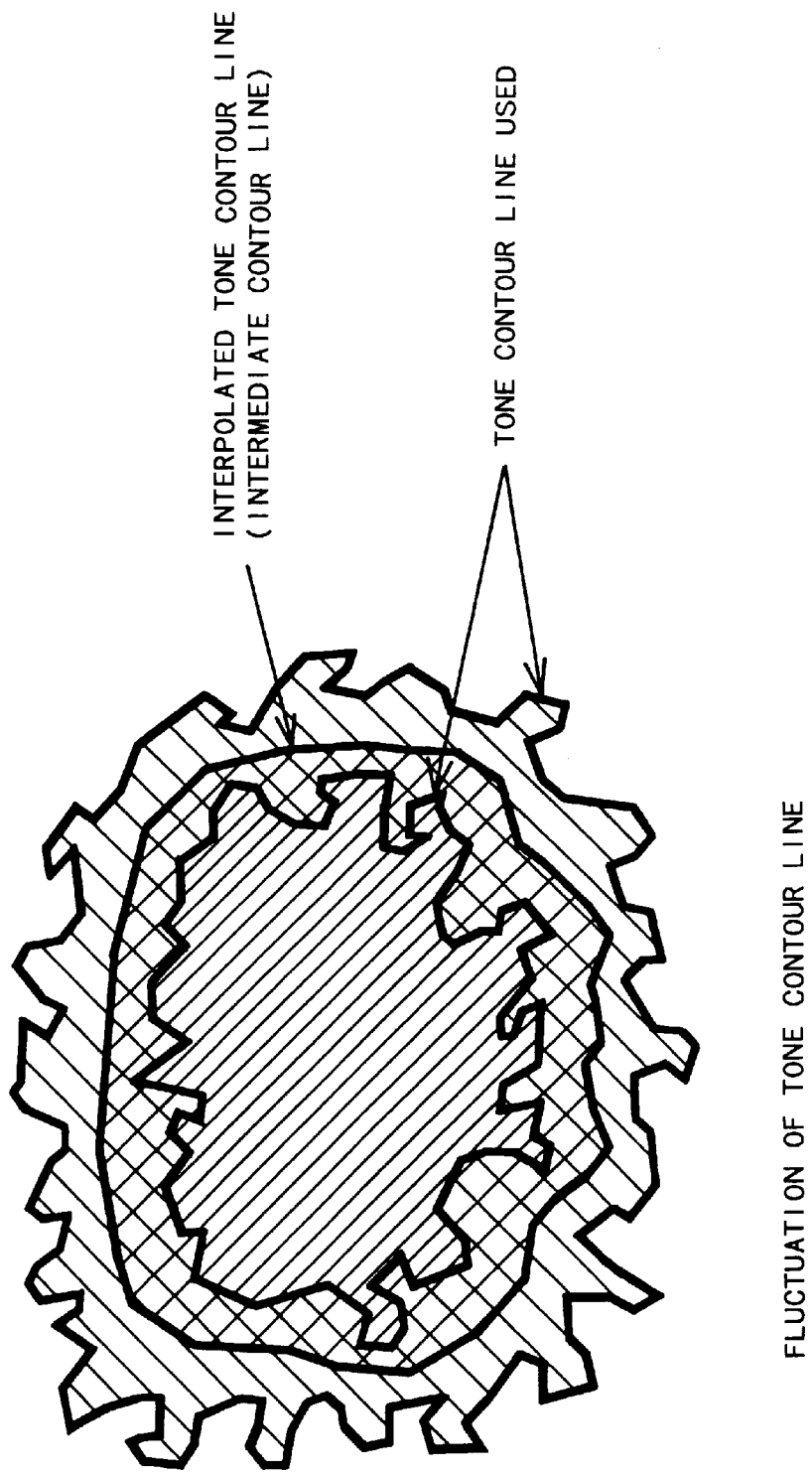
FIG. 24 shows a result obtained by interpolating the tones of another multi-tone image.

FIG. 24 illustrates a result obtained by interpolating the tones of another multi-tone image. In this example, although considerable "fluctuation" (unevenness) is observed in original tone contour lines (A-type and B-type contour lines) which are used as reference lines during interpolation, fluctuation is rarely observed in a new tone contour line (intermediate contour line) obtained by interpolation. In such a case, appropriate fluctuation may be added to the intermediate contour line by the fluctuation detection unit 46 and the fluctuation addition unit 48 (FIG. 3).

In this embodiment, a fractalizing process is used as a method of adding fluctuation to the intermediate contour line. In the fractalizing process, the fluctuation detection unit 46 measures the fractal dimension D of the tone contour lines (A-loop and B-loop) which are used as reference lines during tone interpolation.

Figure 25A:
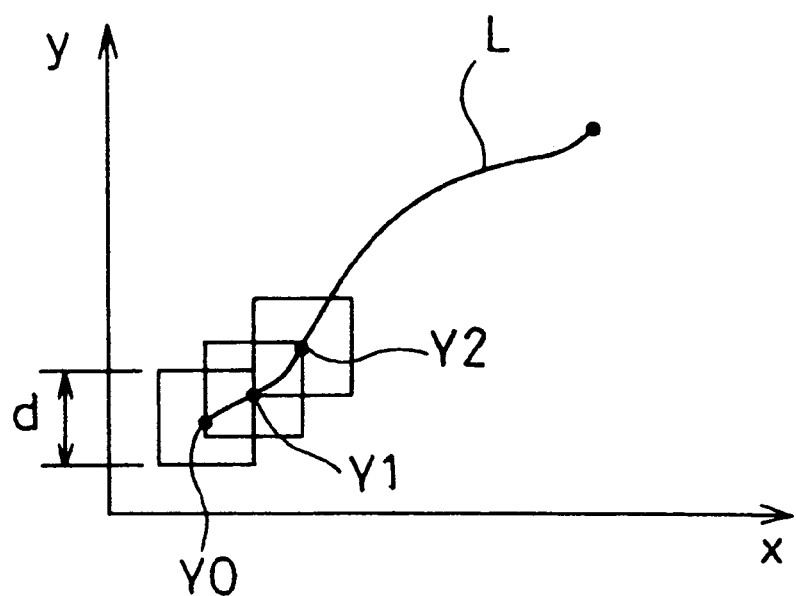
FIGS. 25(a) and 25(b) show a method of measuring a fractal dimension.
Figure 25B:
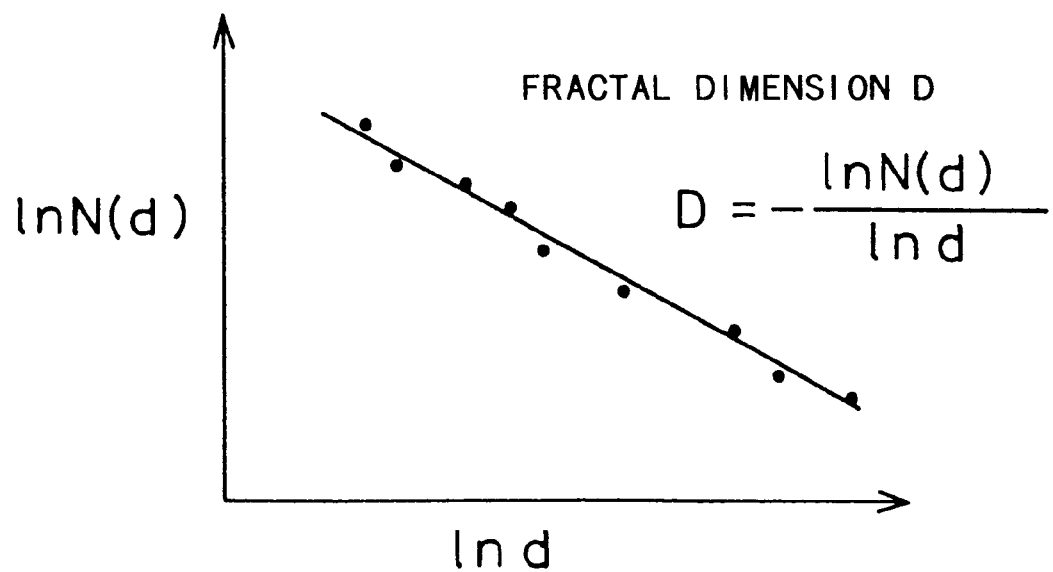

A fractal dimension D is an index for quantitatively indicating the complexity of an arbitrary curve. The fractal dimension D can be measured by Box Counting Method shown in FIGS. 25(A) and 25(B). In measuring a fractal dimension with respect to an arbitrary curve L as shown in FIG. 25(A), a square having a width d is arranged at a start point Y0 of the curve L. A crossing point Y1 of the square and the curve L is calculated. The crossing point Y1 is then reset at the center of the square, and a crossing point Y2 of the square and the curve L is calculated again. In this manner, the curve L is sequentially covered with the squares, and the number N(d) of the squares required to cover the entire curve L is obtained. This number N(d) depends on the width d of the square. The number N(d) of squares required to cover the curve L is obtained while setting the width d at various values. FIG. 25(b) is obtained by plotting the number N(d) of the squares and the width d on both logarithms. As shown in FIG. 25(b), the fractal dimension D is defined by the inclination of the graph.

A fractal dimension does not depend on the size of the curve L. For example, when the curve L is simply magnified M times, the curve in FIG. 25(b) shifts upward by only 1 nM. Therefore, a fractal dimension is not changed by simple magnification/reduction. In this manner, the fractal dimension does not depend on the size of the curve, and is an index indicating complexity.

The word "fractals" means a state wherein even if part of a curve (figure) is magnified, a structure similar to that of the curve is buried in the curve. However, the "fractal dimension," as shown in FIG. 25(b), is not an index related to only the fractals, and the fractal dimension can be measured with respect to any curves and lines.

In general, an increased fractal dimension will give natural fluctuations to the curve after the curve is magnified or after the resolution of the curve is increased.

Usually, a fractalizing process is performed in a multiple recursive manner. The number n of repetition of the fractalizing process may be specified by a user, or may be set in advance at an appropriate value. The curve becomes more complex as the number n of repetition of the fractalizing process increases. In general, the number n of repetition is preferably set to about 2 or 3.

After the fractalized dimension D is measured for the contour lines which are used as reference lines during tone interpolation, the fluctuation addition unit 48 executes a fractalizing process for the intermediate contour line. As described above, in the tone interpolation process shown in FIG. 10, contour data representing the intermediate contour line is not act Therefore, before the fractalizing process (fluctuation adding process) for the intermediate contour line is performed, the contour data of the intermediate contour line is formed according to the same procedure as the procedure shown in FIGS. 12(a), 12(b-1), 12(b-2), 12(c-1) and 12(c-2).

FIGS. 26(A)–26(C) show the outline of a fractalizing process (fluctuation adding process) by Middle-point Displacement Method. In this case, a straight line L12 between two points V1 and V2 is fractalized as described below. In the first conversion shown in FIG. 26(A), the coordinates $(x_m, y_m)$ of a middle point MV of the straight line L12 is calculated according to Equations (4a) and (4b).

$$x_m = \frac{x_1 + x_2}{2} \tag{4a}$$

$$y_m = \frac{y_1 + y_2}{2} \tag{4b}$$

A point V3 is set at a position which extends from the middle point MV in a direction perpendicular to the straight line L12. In this case, a unit vector of a direction perpendicular to the straight line L12 (a direction from the middle point MV to the point V3) is given by Equation (5) described below.

$$(a, b) = \left( \frac{-(y_2 - y_1)}{\sqrt{(x_2 - x_1)^2 + (y_2 - y_1)^2}}, \frac{(x_2 - x_1)}{\sqrt{(x_2 - x_1)^2 + (y_2 - y_1)^2}} \right) \tag{5}$$

In the Middle-point Displacement Method, the coordinates $(x_3, y_3)$ of the point V3 is given by Equations (6a) and (6b).

$$x_3 = x_m + a \times R_g \times 2^{-D} \tag{6a}$$

$$y_3 = y_m + b \times R_g \times 2^{-D} \tag{6b}$$

where $R_g$ is a Gaussian random number (random number whose frequency distribution is a Gaussian distribution) having an average value of 0 and a standard deviation of 1, and D is a fractal dimension. As is apparent from the form of Equations (6a) and (6b), the second term of the right-hand sides of Equations (6a) and (6b) correspond to the differences between the coordinates of the middle point MV and the point V3. The differences are hereinafter referred to as "displacement of middle point." The displacement of middle point depends on the fractal dimension D.

In the second conversion shown in FIG. 26(B), a straight line between the point V1 and the point V3 and another straight line between the point V3 and the point V2 are fractalized respectively. More specifically, a new point V4 is set between the point V1 and the point V3, and a new point V5 is set between the point V3 and the point V2. The positions of the points V4 and V5 are set to be opposite to each other along an extending direction of a straight-line sequence passing through the three points V1, V3, and V2 (e.g., direction from the point V1 to the point V2). FIG. 26(c) shows the result of the third conversion.

In general, coordinates $(x_{k+1}, y_{k+1})$ of a point generated by the kth division is given by Equations (7a) and (7b).

$$x_{k+1} = \frac{x_s + x_e}{2} + \frac{-(y_e - y_s)R_g}{\sqrt{(x_e - x_s)^2 + (y_e - y_s)^2}} \times 2^{-kD} \tag{7a}$$

$$y_{k+1} = \frac{y_s + y_e}{2} + \frac{(x_e - x_s)R_g}{\sqrt{(x_e - x_s)^2 + (y_e - y_s)^2}} \times 2^{-kD} \tag{7b}$$

Here, $(x_e, y_e)$ and $(x_s, y_s)$ are coordinates of the end points of a straight line subject to the kth division (see the example in FIG. 26(c)). Since the second term of the right-hand side of Equations (7a) and (7b) representing displacement of the middle point, includes $2^{-kD}$, it could be understood that displacement at the middle point gradually decreases (i.e., the curve becomes finer) as the number k of the division increases. This division is repeated until a target section of the division becomes smaller than a predetermined limit value $\epsilon$ ($\epsilon > 0$), or it is repeated by a predetermined number of times.

The fractal dimension can be increased by recursively executing the fractalizing process according to the Middle-point Displacement Method. More specifically, a relatively simple intermediate contour line is converted into a more complex curve, so that the intermediate contour line is given appropriate fluctuation which is similar to the tone contour line which are used as reference lines during tone interpolation. In this specification, the word "curve" is used as a broad-sense term including a straight line.

Figures 27A, 27B:
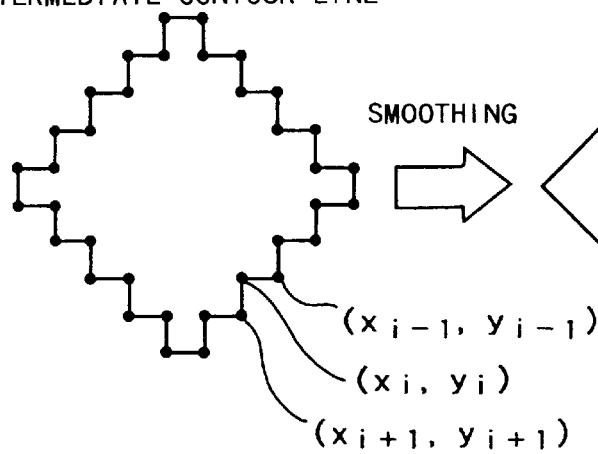
FIGS. 27(a) and 27(b) illustrate a method of smoothing an intermediate contour line.

The intermediate contour line obtained, by the procedure shown in FIGS. 12(a), 12(b-1), 12(b-2), 12(c-1) and 12(c-2) is a boundary contour line extending on the boundary between pixels, and becomes a step-like contour line as shown in FIG. 27(a). The fractalizing process using the Middle-point Displacement Method is not properly applied to the step-like curve. Therefore, before the intermediate contour line is fractalized, the intermediate contour line is preferably smoothed as shown in FIG. 27(b). In this case, the smoothing process is performed according to Equation (8).

$$(x'_i, y'_i) = a(x_i, y_i) + \frac{1-a}{2}\{(x_{i-1}, y_{i-1}) + (x_{i+1}, y_{i+1})\} \qquad (8)$$

Equation (8) means an operation of changing coordinates of a contour point at the center of the three contour points shown in FIG. 27(a) on the basis of the coordinates of the three contour points. The left-hand side of Equation (8) is the coordinates of the ith contour point after the smoothing process. A constant a is a value falling within the range of 0<a<1. The constant a is preferably about 0.2.

The smoothing process shown in FIG. 27 is not required if fluctuation is to be added to the intermediate contour line by another type of the fractalizing process suitable for the step-like curve, instead of the Middle-point Displacement Method. Another method other than the fractalizing process can be employed as a processing method of giving fluctuation to the intermediate contour line. For example, Fast Fourier Transformation may be performed on the intermediate contour line to extract the high frequency component of the intermediate contour line, and 1/f fluctuation can be given to the intermediate contour line.

As described above, according to the above embodiment, all possible image levels of the multi-tone image data are input as test data to the look-up table 116 (FIG. 4) representing tone conversion characteristics, and the tone reference table 122 is produced on the basis of the outputs from the look-up table 116. Tone jumps included in the tone-converted image data is detected from those present in the tone reference table 122. The embodiment then detects the contour lines, with respect to each detected tone jump, which defines the areas whose image levels are adjacent to the tone jump. The inclusive relationship between these contour lines is examined, and a set of contour lines constituting the boundary between the target area for tone interpolation and the other areas are readily extracted. The pixel value of each pixel in the target area is determined depending on the minimum distances from each pixel to the A-loop and to the B-loop of the set of contour lines, and an intermediate image level is allocated to a part of the target area. Therefore, tone interpolation can be smoothly performed without performing the pixel value averaging process.

E. Other Embodiments

Figure 28B:
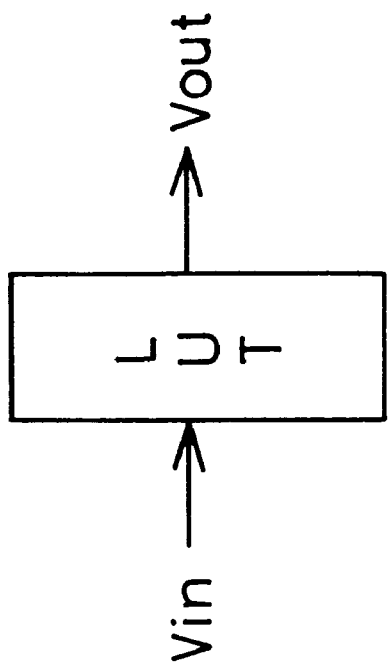
FIGS. 28(a) and 28(b) illustrate a method of converting the tones of multi-tone image data by using a look-up table in another embodiment of the present invention.
Figure 28A:
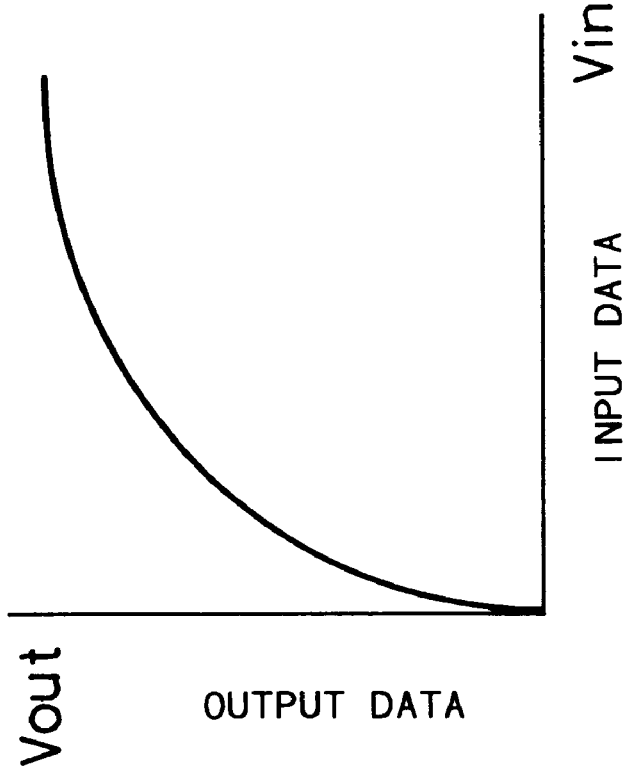

FIGS. 28(a) and 28(b) illustrate a method of converting the tones of multi-tone image data in another embodiment of the present invention. This tone conversion is tone correction using a look-up table. FIG. 28(a) shows tone correction characteristics (tone conversion characteristics) for correcting input image data Vin into output image data Vout. As shown in FIG. 28(b), the input image data Vin is input to a look-up table, and the output image data Vout is output therefrom.

FIGS. 29(a-1)–29(c-1) and 29(a-2)–29(c-2) illustrate an example of tone correction depending on various tone correction characteristics. FIGS. 29(a-1), 29(b-1), and 29(c-1) show tone correction curves, and FIGS. 29(a-2), 29(b-2), and 29(c-2) show gradation images after tone correction by these tone correction curves, respectively. FIG. 29(a-1) shows characteristics in which the input image data Vin is equal to the output image data Vout. Therefore, the image in FIG. 29(a-1) is the same as the original image before tone correction.

In FIG. 29(b-2), there is a tone jump between the values of 0 and 3 of the image data Vout. In FIG. 29(c-2), there is a tone jump between the values of 5 and 7 of the image data Vout. In this manner, a tone jump may be generated as a result of tone correction.

Figure 30:
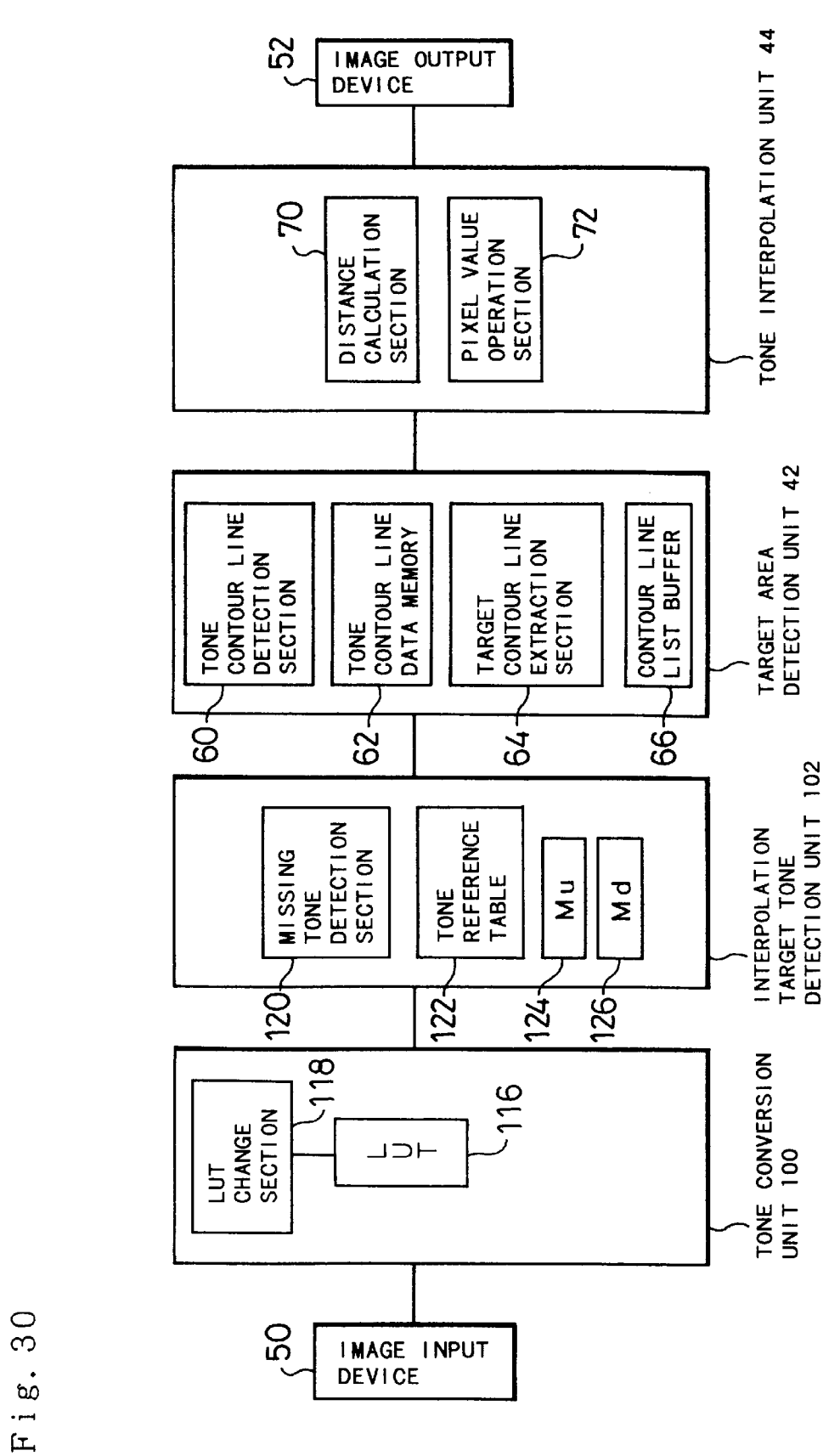
FIG. 30 is a functional block diagram showing the inner arrangements of units 100, 102, 42, and 44 when tone correction is performed by a look-up table.

FIG. 30 is a functional block diagram showing the inner structure of units 100, 102, 42, and 44 when tone correction is performed by a look-up table. The structure of FIG. 30 is obtained by replacing the histogram change section 112 and the histogram 114 in the structure of FIG. 4 with a look-up table change section 118. The look-up table change section 118 changes the contents of a look-up table 116 according to specification of a tone correction curve by a user. The specification of the tone correction curve by the user may be performed in the following manner. That is, the tone correction curves shown in FIGS. 29(a-1) to 29(c-1) are displayed on a color CRT 36, and the shapes of the curves are changed by using a coordinate input device such as a mouse 32.

Figure 31:
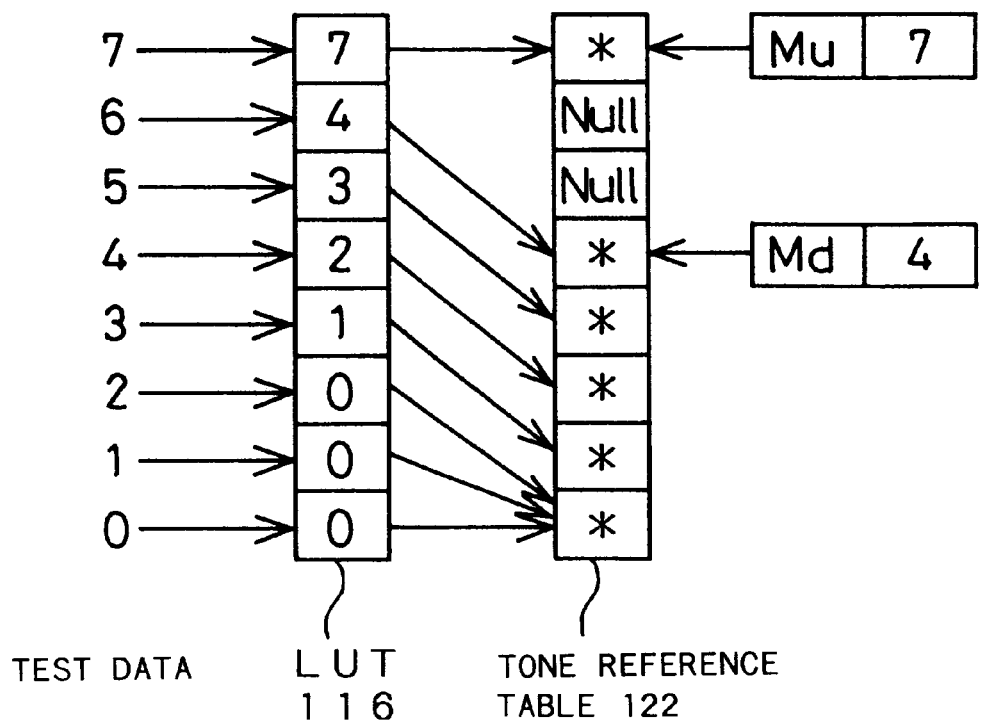
FIG. 31 illustrates an interpolation target tone detected with respect to the image in FIG. 29(c-2)

FIG. 31 illustrates an interpolation target tone detected with respect to the image in FIG. 29(c-2). A missing tone detection section 120 detects the interpolation target tone according to the above procedure in steps T3 to T10 shown in FIG. 5. As a result, the value of the under marker Md is set to 4, and the value of the upper marker Mu is set to 7. A method of tone interpolation using these markers is the same as that described in FIG. 10.

In this manner, even if a multi-tone image is converted by tone correction using a look-up table, a tone jump present in the image after tone correction can be readily detected, and tone interpolation will be executed with respect to the detected tone jump.

Figure 32:
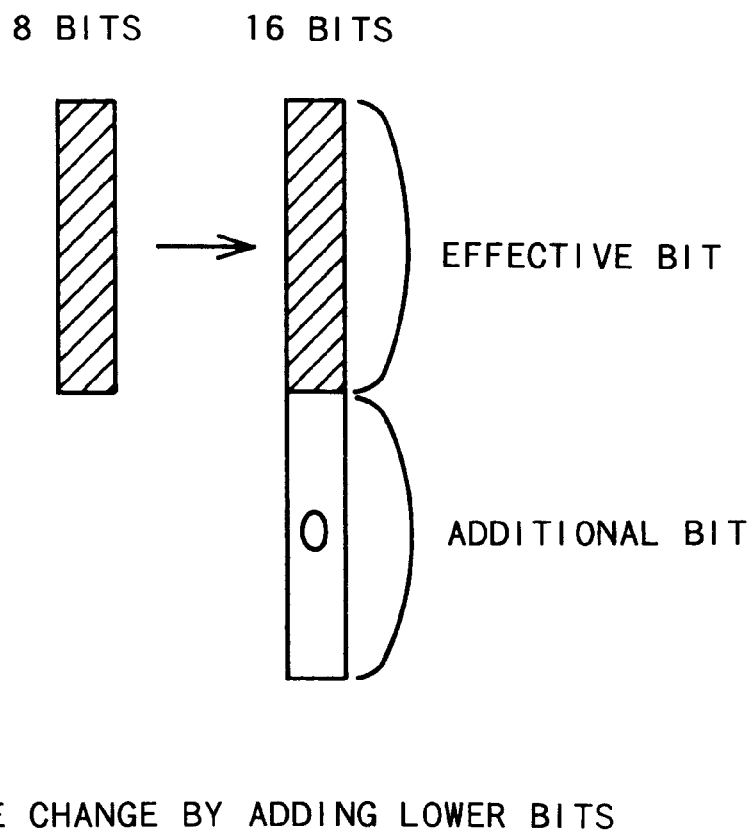
FIG. 32 illustrates the tone conversion method for multi-tone image data using an addition of lower bits in still another embodiment of the present invention.

FIG. 32 schematically illustrate the tone conversion method for multi-tone image data through addition of lower bits in still another embodiment of the present invention. In the addition of lower bits, 0 bits are added to the lower of effective bits to enlarge the tone resolution (dynamic range) of image data. In the example of FIG. 32, 8 bit data (256 tones) are expanded to 16 bit data (64,000 tones). The addition of lower bits is used when the tone resolution of image data read by an input device such as a scanner or a digital camera is increased and then modified by a computer system into a high-quality image.

FIGS. 33(a)–33(c) illustrate tone correction by the addition of lower bits and the contents of tone interpolation to be performed later. FIG. 33(a) shows the histogram of original multi-tone image data, and FIG. 33(b) shows a histogram obtained after the number of bits is increased by 1. The increase of the number of bits generates a periodical tone jump. By executing the tone interpolation according to the present invention on the multi-tone image after the addition of lower bits, an image having smooth tones and free from a tone jump can be obtained as shown in FIG. 33(c).

Figure 34:
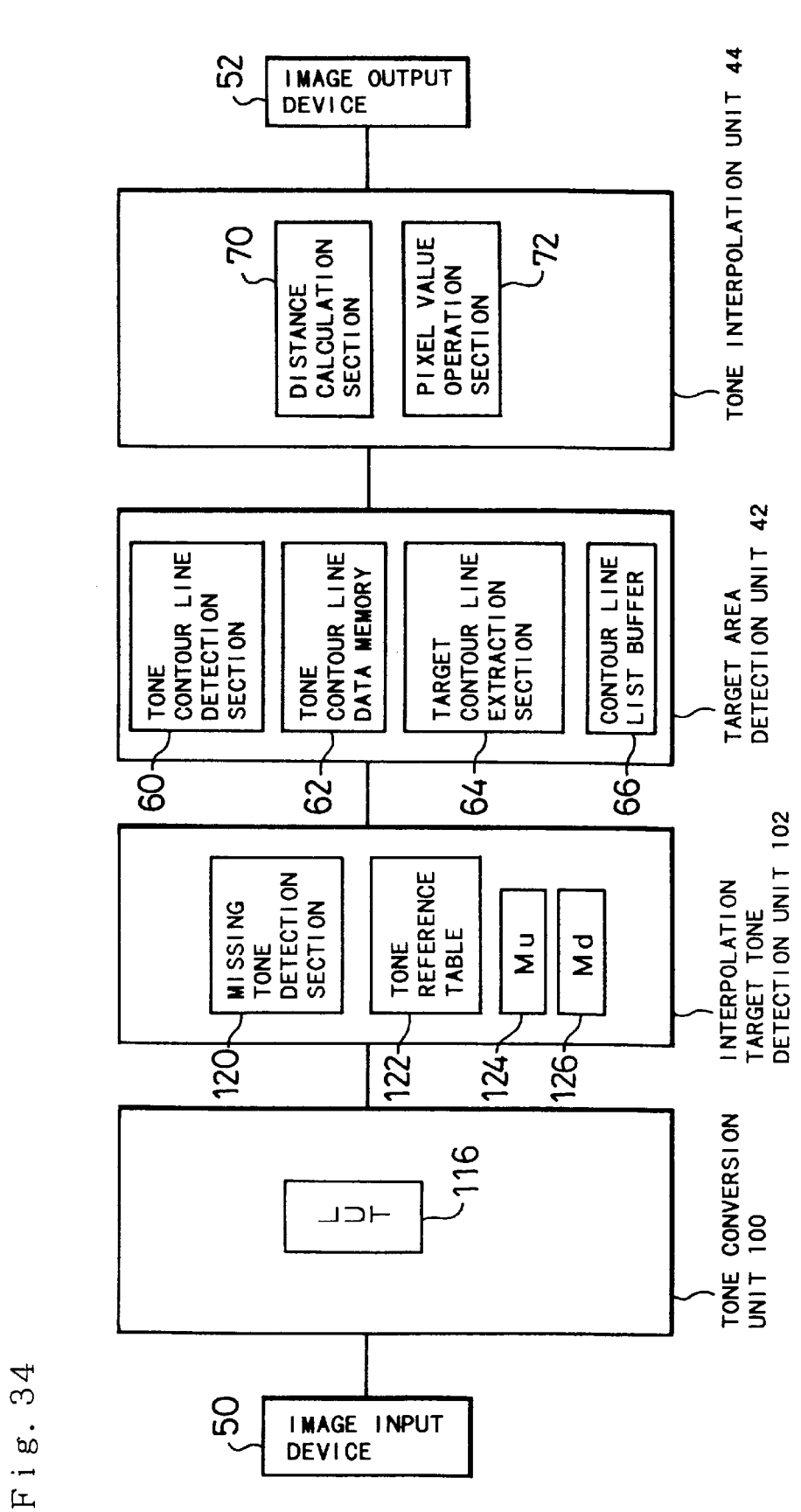
FIG. 34 is a block diagram showing the inner arrangements of units 100, 102, 42, and 44 when an apparently increase in number of bits is performed.

FIG. 34 is a block diagram showing the inner structure of the units 100, 102, 42, and 44 when the addition of lower bits is performed as the tone conversion. The structure of FIG. 34 is obtained by omitting the histogram change section 112 and the histogram 114 of FIG. 4. Tone conversion characteristics corresponding to the addition of lower bits are registered in the look-up table 116.

Figure 35:
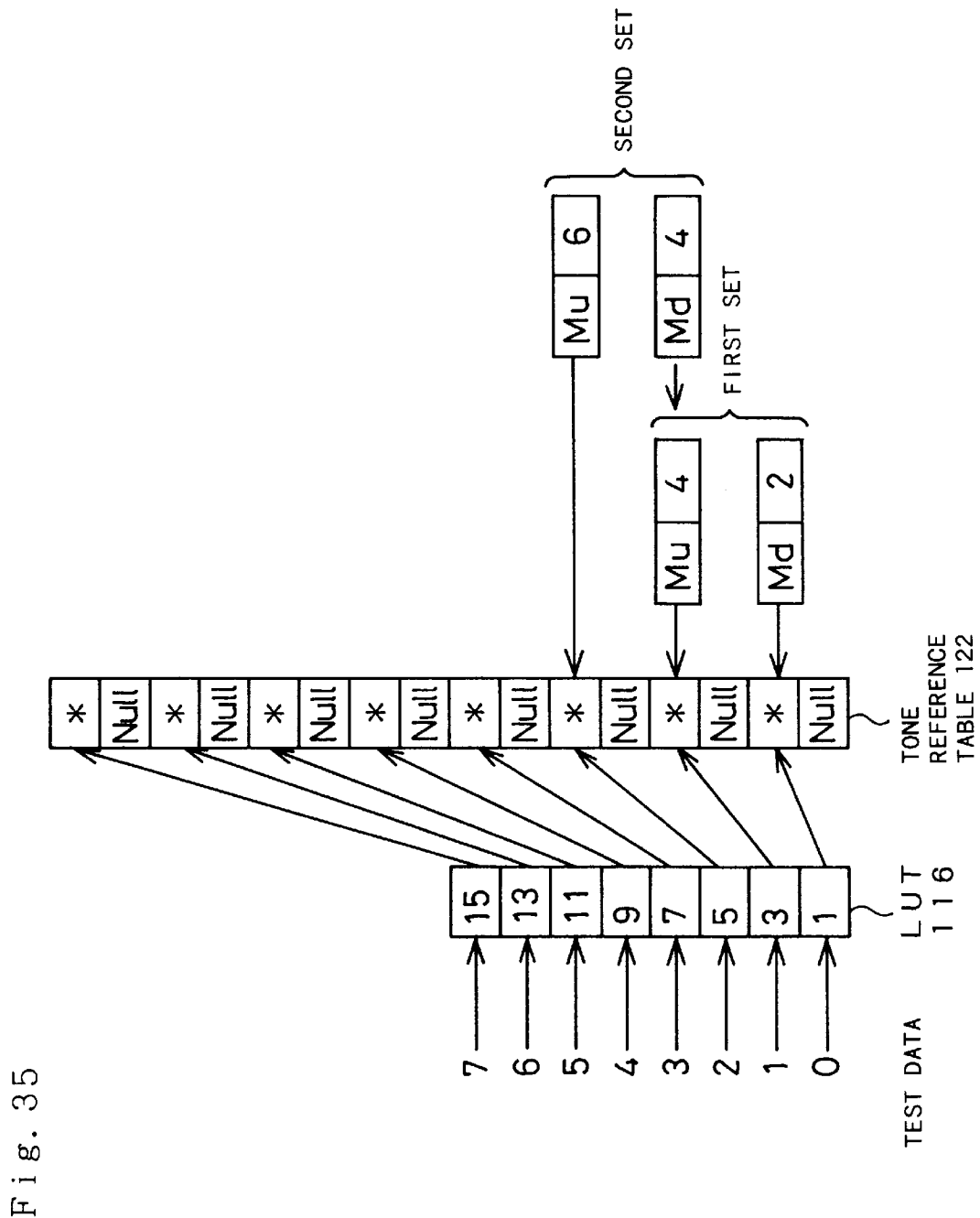
FIG. 35 illustrates an interpolation target tone detected with respect to an image in which the number of bits is apparently increased by 1.

FIG. 35 illustrates an interpolation target tone detected with respect to an image in which the number of bits is increased by 1. Detection of the interpolation target tone is performed by the missing tone detection section 120 according to the procedure in steps S3 to S10 in FIG. 5. A plurality of tone jumps will be detected, and plural sets of the under marker Md and the upper marker Mu will be obtained accordingly. The first set includes the under marker Md of 2 and the upper marker Mu of 4. The second set includes the under marker Md of 4 and the upper marker Mu of 6. Although the values of the third and higher sets are omitted, the values of the under marker Md and the upper marker Mu with respect to each tone jump are determined in the same manner as described above. The method of tone interpolation using these markers is the same as described along with FIG. 10.

In this manner, when the tones of a multi-tone image are converted by addition of lower bits of zeroes, tone jumps present in the image after the tone correction are detected, and tone interpolation can be executed on the tone jumps. As the method of tone conversion, not only the above method, but also other various methods can be applied in the present invention.

The present invention is not limited to the above embodiments, and various embodiments of the present invention can be performed without departing from the spirit and scope of the present invention. For example, the following modification can be made.

In the above embodiment, all possible image levels of the image data are input as test data to a look-up table representing tone conversion characteristics to produce a tone reference table 122, and tone jumps (under marker Md and upper marker Mu) are detected by using the tone reference table 122. However, the present invention can be applied to not only a case wherein a look-up table is used but also a case wherein tone conversion characteristics are represented by another means such as a mathematical function. In such a case, when all possible image levels of a multi-tone image are converted by the tone conversion characteristics, all-levels conversion data constituted by the data obtained by converting the all possible image levels is preferably formed. In this manner, tone jumps included in the tone-converted image data can be detected without examining the tone-converted image data itself.

In place of detecting tone jumps from the tone conversion characteristics, the tone jumps may be detected by examining the tone-converted image data itself. For example, the histogram of the tone-converted image data may be produced so that tone jumps present in the histogram can be detected.

In the above embodiments, the entire multi-tone image is used as a target for the tone interpolation process. However, a part of the multi-tone image may be specified for the target of the tone interpolation process. A target part of the multi-tone image may be specified by a user on the screen of the color CRT 36, or by analyzing multi-tone image data to automatically identify an image area where a tone jump is present.

In particular, if a tone jump is not present in the entire multi-tone image but only in a certain area, the tone jump within the certain area can be properly interpolated while the certain area is used as a target for tone interpolation,.

Figure 36A:
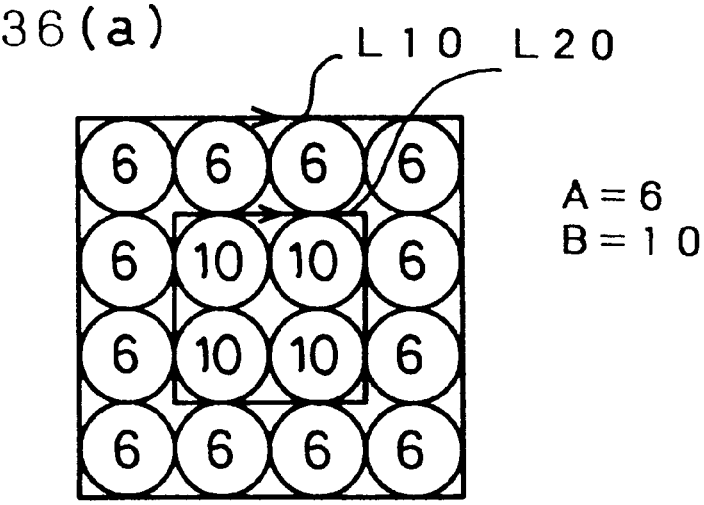
FIGS. 36(a) and 36(b) illustrate a case wherein an image area is enlarged and then subjected to the tone interpolation process.
Figure 36B:
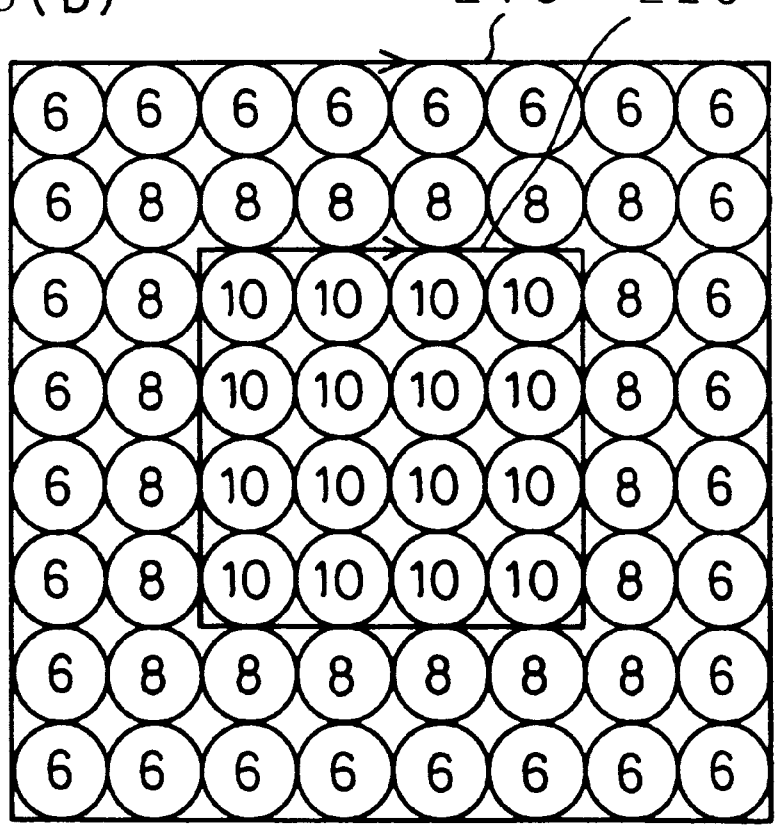

An image area as a target for a tone interpolation process may be expanded before the tone interpolation. FIGS. 36(a) and 36(b) illustrate a case wherein an image area is expanded and then subjected to the tone interpolation process. Assume, in FIG. 36(a), that A-level and B-level are set to 6 and 10, respectively, and that the tone interpolation at an intermediate image level (e.g., 8) is to be executed on a target area (an area having A-level of 6) defined by an A-type contour line L10 and a B-type contour line L20. However, tone interpolation cannot be executed on the target area having an image level of 6 shown in FIG. 36(a) because the target area has only a one-pixel width. On the other hand, if the multi-tone image of FIG. 36(a) is enlarged by a factor of two, the target area having A=6 level can be interpolated to produce an 8-level intermediate area as shown in FIG. 36(b). As a result, tone interpolation is achieved to obtain smooth tones.

Although FIGS. 36(a) and 36(b) show a simplified case, image tones can be generally made more smooth by executing tone interpolation after a target image area is expanded. The multi-tone image after the tone interpolation may be reduced by a desired factor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of interpolating a tone jump in a multi-tone image, comprising the steps of:

(a) providing target multi-tone image data having a tone jump, said tone jump including a plurality of missing image levels between a first image level and a second image level, said first image level being greater than said second level;

(b) processing said target multi-tone image data to obtain first contour data representing an A-type contour line indicating a boundary between an area having said first image level and another area having an image level lower than said first image level;

(c) processing said target multi-tone image data to obtain second contour data representing a B-type contour line indicating a boundary between said area having said first image level and other area having an image level no lower than said second image level;

(d) examining an inclusive relationship between said A-type and B-type contour lines on the basis of said first and second contour data to detect a target area for tone interpolation and to extract a set of contour lines indicating a boundary of said target area among said A-type and B-type contour lines, said target area being included in said area having said first image level and being adjacent to an area having said second image level; and (e) dividing an area, within said target area, located between said A-type contour line and said B-type contour line of said set of contour lines into (N+1) divided areas, where N is an integer of at least 1, and sequentially allocating N intermediate image levels to N divided areas which are closer to the image area having the second image level among said (N+1) divided areas.

2. A method in accordance with claim 1, wherein said step (a) comprises the steps of:

(i) executing tone conversion on original multi-tone image data to produce said target multi-tone image data;

(ii) identifying said first and second image levels to be included in said target multi-tone image data.

3. A method in accordance with claim 2, wherein said step (ii) comprises the steps of:

converting all possible image levels of said target multi tone image data by tone conversion characteristics of said tone conversion in said step (i), to thereby generate all-levels conversion data; and detecting said tone jump present in said all-levels conversion data and determining said first image level to be a next lower image level below the detected tone jump and determining the second image level to be a next higher image level above the detected tone jump.

4. A method in accordance with claim 2, wherein said target multi-tone image data include a plurality of tone jumps; and wherein the step (ii) comprises the step of obtaining plural sets of said first and second image levels with respect to said plurality of tone jumps; and wherein said method further comprises the step of:

(f) executing said steps (b) through (e) with respect to each of said plural sets of said first and second image levels.

5. A method in accordance with claim 1, wherein the step (e) comprises the step of determining an image level of each pixel in said target area according the following Equation to produce said (N+1) divided areas:

$$val(p) = val(md) + \frac{\{val(Mu) - val(Md)\} \times D(Md)}{D(Md) + D(Mu)}$$

where val(p) is the image level of each pixel in said target area, val(Md) is said first image level, val(Mu) is said second image level, D(Md) is a minimum distance from a pixel-to-processed to said A-type contour line, and D(Mu) is a minimum distance from the pixel-to-processed to said B-type contour line.

6. A method in accordance with claim 1, wherein the step (e) comprises the step of producing said (N+1) divided areas in said target area such that N intermediate contour lines dividing said (N+1) divided areas are formed at positions where a minimum distance from each intermediate contour line to said A-type contour line and a minimum distance to said B-type contour line among said set of contour lines have a predetermined relationship.

7. A method in accordance with claim 6, wherein said predetermined relationship is that said minimum distance to said A-type contour line and said minimum distance to said B-type contour line have a ratio of m:n, where m and n are integers satisfying $1 \leq m \leq N$ and $1 \leq n \leq N$, and where N combinations of m and n satisfy m+n=N+1.

8. A method in accordance with claim 1, wherein the step (d) comprises the steps of:

(d1) classifying the A-type contour lines included in said set of contour lines into an $A^+$-type contour line and an $A^-$-type contour line, said $A^+$-type contour line defining an inner area whose image level is no lower than said first image level, said $A^-$-type contour line defining an inner area whose image level is lower than said first image level;

(d2) classifying the B-type contour lines included in said set of contour lines into an $B^+$-type contour line and an $B^-$-type contour line, said $B^+$-type contour line defining an inner area whose image level is no lower than said second image level, said $B^-$-type contour line defining an inner area whose image level is lower than said second image level; and (d3) detecting at least one of a first area and a second area as the target area, said first area being located between said $A^+$-type contour line and said $B^+$-type contour line, said second area being located between said $B^-$-type contour line and said $A^-$-type contour line.

9. A method in accordance with claim 1, further comprising the steps of:

(g) extracting N intermediate contour lines which are present at boundaries of said (N+1) divided areas; and (h) adding fluctuation to said N intermediate contour lines.

10. A method in accordance with claim 1, wherein said step (a) further comprises the step of enlarging the target multi-tone image.

11. An apparatus for interpolating a tone jump in a multi-tone image, comprising:

means for providing target multi-tone image data having a tone jump, said tone jump including a plurality of missing image levels between a first image level and a second image level, said first image level being greater than said second level;

first contour detection means for processing said target multi-tone image data to obtain first contour data representing an A-type contour line indicating a boundary between an area having said first image level and another area having an image level lower than said first image level;

second contour detection means for processing said target multi-tone image data to obtain second contour data representing a B-type contour line indicating a boundary between said area having said first image level and other area having an image level no lower than said second image level;

target contour extraction means for examining an inclusive relationship between said A-type and B-type contour lines on the basis of said first and second contour data to detect a target area for tone interpolation and to extract a set of contour lines indicating a boundary of said target area among said A-type and B-type contour lines, said target area being included in said area having said first image level and being adjacent to an area having said second image level; and interpolation means for dividing an area, within said target area, located between said A-type contour line and said B-type contour line of said set of contour lines into (N+1) divided areas, where N is an integer of at least 1, and sequentially allocating N intermediate image levels to N divided areas which are closer to the image area having the second image level among said (N+1) divided areas.

12. An apparatus in accordance with claim 11, wherein said means for providing comprises:

tone conversion means for executing tone conversion on original multi-tone image data to produce said target multi-tone image data;

interpolation target tone detection means for identifying said first and second image levels to be included in said target multi-tone image data.

13. An apparatus in accordance with claim 12, wherein said means for identifying comprises:

means for converting all possible image levels of said target multi-tone image data by tone conversion characteristics of said tone conversion used by said tone conversion means, to thereby generate all-levels conversion data; and means for detecting said tone jump present in said all-levels conversion data and determining said first image level to be a next lower image level below the detected tone jump and determining the second image level to be a next higher image level above the detected tone jump.

14. An apparatus in accordance with claim 12, wherein said target multi-tone image data include a plurality of tone jumps; and wherein said tone conversion means comprises means for obtaining plural sets of said first and second image levels with respect to said plurality of tone jumps.

15. An apparatus in accordance with claim 11, wherein said interpolation means comprises means for determining an image level of each pixel in said target area according the following Equation to produce said (N+1) divided areas:

$$val(p) = val(md) + \frac{\{val(Mu) - val(Md)\} \times D(Md)}{D(Md) + D(Mu)}$$

where val(p) is the image level of each pixel in said target area, val(Md) is said first image level, val(Mu) is said second image level, D(Md) is a minimum distance from a pixel-to-processed to said A-type contour line, and D(Mu) is a minimum distance from the pixel-to-processed to said B-type contour line.

16. An apparatus in accordance with claim 11, wherein said interpolation means comprises means for producing said (N+1) divided areas in said target area such that N intermediate contour lines dividing said (N+1) divided areas are formed at positions where a minimum distance from each intermediate contour line to said A-type contour line and a minimum distance to said B-type contour line among said set of contour lines have a predetermined relationship.

17. An apparatus in accordance with claim 16, wherein said predetermined relationship is that said minimum distance to said A-type contour line and said minimum distance to said B-type contour line have a ratio of m:n, where m and n are integers satisfying $1 \leq m \leq N$ and $1 < n \leq N$, and where N combinations of m and n satisfy m+n=N+1.

18. An apparatus in accordance with claim 11, wherein the target contour extraction means comprises:

means for classifying the A-type contour lines included in said set of contour lines into an $A^+$-type contour line and an $A^-$-type contour line, said $A^+$-type contour line defining an inner area whose image level is no lower than said first image level, said $A^-$-type contour line defining an inner area whose image level is lower than said first image level;

means for classifying the B-type contour lines included in said set of contour lines into an $B^+$-type contour line and an $B^-$-type contour line, said $B^+$-type contour line defining an inner area whose image level is no lower than said second image level, said $B^-$-type contour line defining an inner area whose image level is lower than said second image level; and means for detecting at least one of a first area and a second area as the target area, said first area being located between said $A^+$-type contour line and said $B^+$-type contour line, said second area being located between said $B^-$-type contour line and said $A^-$-type contour line.

19. An apparatus in accordance with claim 11, further comprising:

means for extracting N intermediate contour lines which are present at boundaries of said (N+1) divided areas; and means for adding fluctuation to said N intermediate contour lines.

20. An apparatus in accordance with claim 11, wherein said means for providing further comprises means for enlarging the target multi-tone image.

21. A computer program product for interpolating a tone jump in a multi-tone image, said computer program product comprising:

a computer readable medium; and computer program code means stored on said computer readable medium, said computer program code means comprising:

program code means for causing a computer to provide target multi-tone image data having a tone jump, said tone jump including a plurality of missing image levels between a first image level and a second image level, said first image level being greater than said second level;

program code means for causing the computer to process said target multi-tone image data to obtain first contour data representing an A-type contour line indicating a boundary between an area having said first image level and another area having an image level lower than said first image level;

program code means for causing the computer to process said target multi-tone image data to obtain second contour data representing a B-type contour line indicating a boundary between said area having said first image level and other area having an image level no lower than said second image level;

program code means for causing the computer to examine an inclusive relationship between said A-type and B-type contour lines on the basis of said first and second contour data to detect a target area for tone interpolation and to extract a set of contour lines indicating a boundary of said target area among said A-type and B-type contour lines, said target area being included in said area having said first image level and being adjacent to an area having said second image level; and program code means for causing the computer to divide an area, within said target area, located between said A-type contour line and said B-type contour line of said set of contour lines into (N+1) divided areas, where N is an integer of at least 1, and to sequentially allocate N intermediate image levels to N divided areas which are closer to the image area having the second image level among said (N+1) divided areas.

* * * * *